(12) United States Patent
Courtney

(10) Patent No.: US 10,680,533 B1
(45) Date of Patent: Jun. 9, 2020

(54) COMMON LAYOUT RECTIFIER OR CONVERTER

(71) Applicant: Hamilton Sundstrand Corporation, Charlotte, NC (US)

(72) Inventor: Christopher J. Courtney, Janesville, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/265,356

(22) Filed: Feb. 1, 2019

(51) Int. Cl.
| | |
|---|---|
| H02J 3/46 | (2006.01) |
| H02M 7/00 | (2006.01) |
| H02P 27/06 | (2006.01) |
| H02P 9/30 | (2006.01) |
| H02M 7/06 | (2006.01) |
| B64D 41/00 | (2006.01) |
| H02M 1/44 | (2007.01) |

(52) U.S. Cl.
CPC ............ *H02M 7/003* (2013.01); *B64D 41/00* (2013.01); *H02M 1/44* (2013.01); *H02M 7/06* (2013.01); *H02P 9/305* (2013.01); *H02P 27/06* (2013.01); *B64D 2221/00* (2013.01)

(58) Field of Classification Search
CPC .......... H02M 7/003; H02M 1/44; H02M 7/06; H02P 9/305; H02P 27/06; B64D 41/00; B64D 2221/00

USPC .............................................. 307/9.1, 24, 64
See application file for complete search history.

(56) References Cited

U.S. PATENT DOCUMENTS

| | | |
|---|---|---|
| 3,755,888 A | 9/1973 | Geil |
| 5,339,219 A | 8/1994 | Urich |
| 6,449,167 B1 | 9/2002 | Seymour |
| 8,991,040 B2 | 3/2015 | Chen |
| 9,559,606 B2 | 1/2017 | Lu et al. |
| 10,153,707 B2 | 12/2018 | Dilley et al. |
| 2016/0107588 A1* | 4/2016 | White .................... B60R 16/03 307/9.1 |

* cited by examiner

*Primary Examiner* — Rexford N Barnie
*Assistant Examiner* — Toan T Vu
(74) *Attorney, Agent, or Firm* — Cantor Colburn LLP

(57) ABSTRACT

Embodiments herein relate to a reconfigurable three-phase rectifier/converter drive. The drive includes a three phase input connection configured for connection to a three phase alternating current power source, a three-phase rectifier bridge operably connected to the three phase input connection, a plurality of capacitors, configurable as a filter, and a positive and negative output terminal connected to and configured to supply a load. The three-phase rectifier/converter drive is configurable by selected connections with at least one positive rail adaptor plate, at least one negative rail adaptor plate, and at least one of filter bus adapter plate as two independent drives supplying independent loads, two drives in series supplying a common load, or two drives in parallel supplying a common load.

20 Claims, 14 Drawing Sheets

COMMON LAYOUT RECTIFIER OR CONVERTER

TECHNICAL FIELD

The subject matter disclosed herein relates generally to the field of motor drives, and power rectifiers and converters, and more particularly to a power rectifier for aircraft power systems.

BACKGROUND

Various systems can utilize a power system to convert power as needed. Vehicle systems user power rectifiers to convert power in generation systems for distribution and use on the vehicle. Building systems use power rectifiers and converters of power systems to covert grid power for uses in elevator systems and large chiller systems utilize a power system to drive compressors and fan systems. Conveyance systems, such as elevator systems, use machines to impart force to a car carrying passengers. The machines employed may need to provide varying power levels depending on the application. When either an elevator system or a chiller system requires a large duty or load, a motor drive needs to be provided to power the machine. Likewise, power generation systems often need to convert large amounts of AC power to DC for a given application. Often, a high power system with a rectifier or converter of sufficient capacity may not exist, which results in high design costs and lengthy development time to manufacture a suitable system. Even if a single, large rectifier or converter exists in the marketplace, costs associated with a single, large unit may be excessive due to specialty components, component availability, etc. Also, high power rectifiers and converters commonly require expensive high voltage components. Therefore, paralleling or multilevel configurations may provide a more cost effective approach.

Commonly, power systems can employ active or passive rectifiers to generate a DC bus and then an inverter scheme to drive the motors. This is done to improve performance of the power system in particular for variable speed or variable capacity systems. However, a variety of architectures may be employed for power rectifiers and converters to provide the best efficiency and reliability in the power system. For example in some embodiments, an independent rectifier may be employed to drive a load or a plurality of loads. Series, stacked, or multilevel configurations can be advantageous for high voltage applications while avoiding high stress levels on components. Similarly, paralleled configurations can provide for increased load capabilities while also reducing conduction stresses on components. Identifying the advantages and disadvantages of various topologies can sometimes be difficult based on timing and switching of power, electromagnetic interference (EMI), and the like. Evaluating various configurations and topologies for power systems and particularly rectifiers and converters facilitates selecting the most advantageous configuration for a given application.

BRIEF DESCRIPTION

According to one embodiment of the invention, described herein Embodiments herein relate to a reconfigurable three-phase rectifier/converter drive. The drive includes a three phase input connection configured for connection to a three phase alternating current power source, a three-phase rectifier bridge operably connected to the three phase input connection, a plurality of a capacitors, configurable as a filter, and a positive and negative output terminal connected to and configured to supply a load. The three-phase rectifier/converter drive is configurable by selected connections with at least one positive rail adaptor plate, at least one negative rail adaptor plate, and at least one of filter bus adapter plate as two independent drives supplying independent loads, two drives in series supplying a common load, or two drives in parallel supplying a common load.

In addition to one or more of the features described above, or as an alternative, further embodiments may include that the at least one positive rail adaptor plate, at least one negative rail adaptor plate, and at least one of filter bus adapter plate are stacked over one another.

In addition to one or more of the features described above, or as an alternative, further embodiments may include that the at least one positive rail adaptor plate, the at least one negative rail adaptor plate, and the at least one of filter bus adapter plate each include at least one of a plurality of connection points and a plurality of cutouts.

In addition to one or more of the features described above, or as an alternative, further embodiments may include that the plurality of connection points facilitate selected connections to selected components of the drive, while the plurality of cutouts ensure noncontact to other selected components of the drive.

In addition to one or more of the features described above, or as an alternative, further embodiments may include a second positive rail adaptor plate configured and connected substantially as a mirror image of the first positive rail adaptor plate, the second positive rail adaptor plate having a second positive output connection connected to a second positive output terminal.

In addition to one or more of the features described above, or as an alternative, further embodiments may include that the second positive rail adaptor plate is configured and connected substantially as a mirror image of the first positive rail adaptor plate.

In addition to one or more of the features described above, or as an alternative, further embodiments may include a second negative rail adaptor plate configured and connected substantially as a mirror image for the first negative rail adaptor plate, the second negative rail adaptor plate having a second negative output connection connected to a second negative output terminal.

In addition to one or more of the features described above, or as an alternative, further embodiments may include that the second negative rail adaptor plate is configured and connected substantially as a mirror image of the first negative rail adaptor plate.

In addition to one or more of the features described above, or as an alternative, further embodiments may include that the at least one filter bus adaptor plate includes at least one output connection under selected conditions.

In addition to one or more of the features described above, or as an alternative, further embodiments may include a common point connector and the at least one of filter bus adapter plate connected to the common point connector.

In addition to one or more of the features described above, or as an alternative, further embodiments may include that the selected connections of the positive rail adapter plate, negative rail adapter plate and filter bus adapter plate configure the plurality of capacitors in selected series and parallel arrangements for each of the at least one of two independent drives supplying independent loads, two drives in series supplying a common load, and two drives in parallel supplying a common load.

Also described herein in another embodiment is a method of configuring a three-phase rectifier/converter drive. The method includes operably connecting a first three phase input connection and a second three phase input connection to a three phase alternating current power source, operably connecting a first three phase rectifier bridge having three phase legs, each phase leg having a positive connection, a negative connection and an input connection operably connected to the first three phase input connection, and operably connecting a second three phase rectifier bridge having three phase legs, each phase leg having a positive connection, a negative connection and an input connection operably connected to the second three phase input connection. The method also includes configuring a plurality of a capacitors as a first filter and a second filter, each capacitor having a positive and a negative connection, operably connecting a positive output connection and a negative output connection, where at least the positive output connection and negative output connection are connected to and configured to supply a load, selectively connecting at least one of the positive connections for the first three-phase rectifier bridge and the positive connection of second three-phase rectifier bridge, selected positive connections of the plurality of capacitors, and the positive output terminal with at least one positive rail adaptor plate, and selectively connecting at least one of the negative connections for the first three-phase rectifier bridge and the negative connections of second three-phase rectifier bridge, selected negative connections of the plurality of capacitors, and the negative output terminal with at least one negative rail adaptor plate. Furthermore, the method also includes selectively connecting at least one selected positive and negative connections of the plurality of capacitors, and the negative connections for the first three-phase rectifier bridge and the positive connections of second three-phase rectifier bridge with at least one filter bus adapter plate and configuring the three-phase rectifier/converter drive as at least one of two independent drives supplying independent loads, two drives in series supplying a common load, and two drives in parallel supplying a common load, by selecting connections with at the least one positive rail adaptor plate, the at least one negative rail adaptor plate, and the at least one of filter bus adapter plate.

In addition to one or more of the features described above, or as an alternative, further embodiments of the method may include stacking the at least one positive rail adaptor plate, at least one negative rail adaptor plate, and at least one of filter bus adapter plate over one another.

In addition to one or more of the features described above, or as an alternative, further embodiments of the method may include that the at least one positive rail adaptor plate, the at least one negative rail adaptor plate, and the at least one of filter bus adapter plate each include at least one of a plurality of connection points and a plurality of cutouts.

In addition to one or more of the features described above, or as an alternative, further embodiments of the method may include that the plurality of connection points facilitate selected connections to selected components of the drive, while the plurality of cutouts ensure noncontact to other selected components of the drive.

In addition to one or more of the features described above, or as an alternative, further embodiments of the method may include connecting a second positive rail adaptor plate, the second positive rail adaptor plate having a second positive output connection connected to a second positive output terminal.

In addition to one or more of the features described above, or as an alternative, further embodiments of the method may include connecting a second negative rail adaptor plate, the second negative rail adaptor plate having a second negative output connection connected to a second negative output terminal.

In addition to one or more of the features described above, or as an alternative, further embodiments of the method may include connecting at least one output connection to the at least one filter bus adaptor plate under selected conditions.

In addition to one or more of the features described above, or as an alternative, further embodiments of the method may include a common point connector and the at least one of filter bus adapter plate connected to the common point connector.

In addition to one or more of the features described above, or as an alternative, further embodiments of the method may include that selected connections of the positive rail adapter plate, negative rail adapter plate and filter bus adapter plate configure the plurality of capacitors in selected series and parallel arrangements for each of the at least one of two independent drives supplying independent loads, two drives in series supplying a common load, and two drives in parallel supplying a common load.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
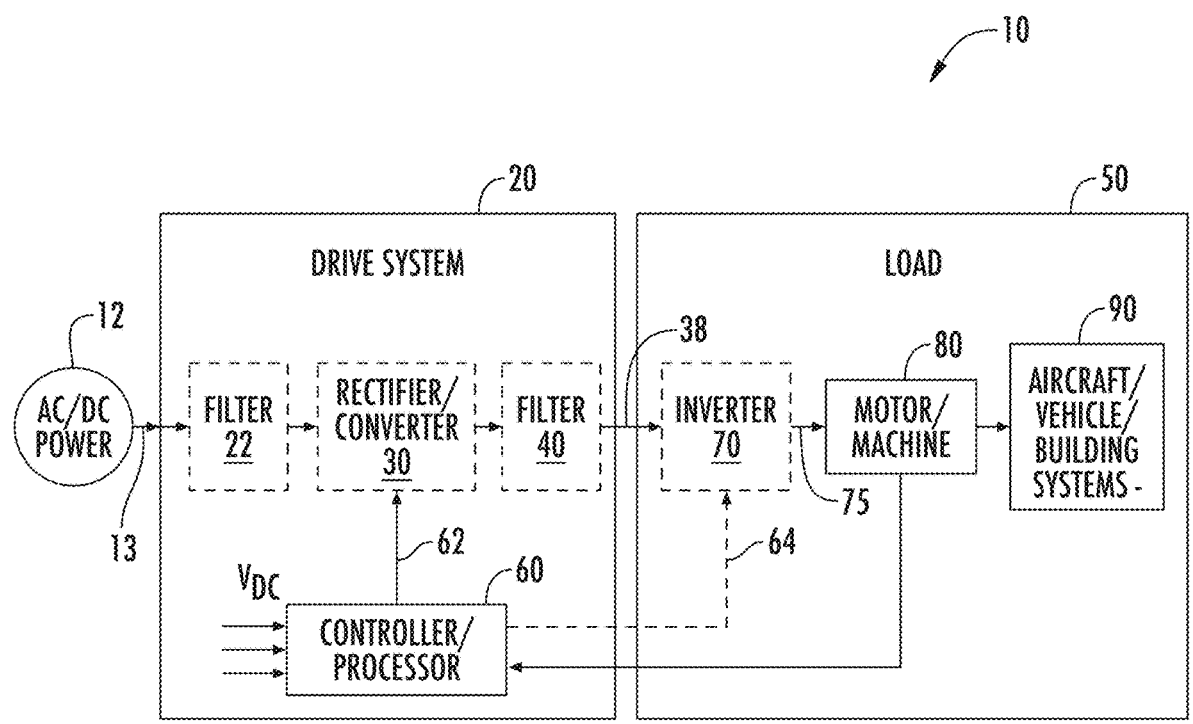
FIG. 1 depicts a power system for a building system in accordance with an embodiment.

In general, embodiments herein relate to a rectifier to supply a DC bus that in turn supplies voltage to a load. The load may be any variety of loads including DC loads, or a further converter that drives a motor. In this way, the embodiments herein relate to configuring an active or passive rectifier to convert power from an AC bus, that is typically, but not necessarily three-phase, to a DC bus. Embodiments herein set forth a rectifier and or drive, and motor system and/or method for a rectifier system (e.g., a three-phase passive front-end rectifier) to actively formulate and control a DC voltage for subsequent use by a load or converter.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In one embodiment, the three-phase front-end rectifier is utilized in a power system of an aircraft. For example pare of an aircraft power system receiving power from a power source, typically a generator and converting the power for use by an load. In an embodiment the rectifier converts power from a three-phase AC generator to supply a DC bus, which is then employed to power a load. The load may include a DC bus and/or a converter employed to generate command signals to drive a motor and the like.

In another embodiment the three-phase rectifier is part of a power system in a building heating ventilation and air conditioning or refrigeration system (HVAC/R). For example, a building HVAC/R can employ a chiller system driven by a power system including a motor drive with rectifier and inverter as described herein In some instances the rectifier may be a three-phase passive front-end rectifier. In an embodiment a passive rectifier with and without interleaving is disclosed. The drive may also include a power electronics inverter (e.g., as a variable speed alternating current (AC) motor drive) to improve the performance of the chiller system.

In another embodiment, the three-phase passive front-end rectifier is utilized in an electric motor system 23 of an elevator system. The elevator system also includes a hoistway having a plurality of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments of the three-phase passive front-end rectifier include powers systems for trains, boats, planes, etc.

FIG. 1 is a block diagram of components of a power system 10 as may be employed to power one or more systems or loads 90. The power system 10 is described with respect to an aircraft power system, however application to any system where a three phase or motor drive is employed may be envisioned. Power system 10 includes a source of AC/DC power 12, such as an electrical main line, (e.g., 115/230 volt AC 400 Hz, 3-phase), aircraft generator, AC power bus, DC power bus, battery and the like. The AC/DC power 12 is provided to a drive system 20. The drive 20 may include a filter 22 configured to limit inrush currents, stabilizes voltage levels and suppress electromagnetic interference (EMI). The input power signals 13, once filtered (if employed), are provided to a rectifier or converter 30. The rectifier/converter 30 is configured to convert the AC power 12 to a DC voltage. The rectifier/converter 30 may also convert a DC voltage input to a different level DC voltage as may be required in the drive 20. In an embodiment, the rectifier/converter 30 is active and may be a single or multi-level configuration. In another embodiment, the rectifier/converter 30 could also be a simple passive rectifier, e.g., a diode bridge configured to rectify an AC voltage input to a DC voltage. The output of the rectifier/converter 30 supplies a DC bus 38. A filter 40 may also be employed stabilizing the DC bus 38 from transients and to suppress EMI as is conventionally known.

The illustrated drive 20 may provide power to a load depicted as 50. The load could be various loads on the DC bus 34 or could include an inverter 70 to convert the DC voltage on the DC bus 34 to multiphase, AC drive motor command signals 75 configured to drive a motor. Motor command signals 75 from the inverter 70 of the drive system 20 are supplied to a multiphase machine 80. For example, a motor 80 to impart motion to a control surface, power an environmental control system, and the like as depicted by reference numeral 90. In an exemplary embodiment, machine 80 includes, but is not limited to a multiphase, permanent magnet synchronous motor 80. It should also be appreciated, that while the embodiments herein are described primarily with reference to an aircraft electrical system and application, this description is for example only. The embodiments described here are readily applied to any application employing a three-phase rectifier/converter 30 in power application including motor controls, environmental control, control surface actuation, and any other power system and motor control application.

According to one or more embodiments, the rectifier/converter 30 (if an active type) and optionally inverter 70, are controlled by a controller 60. In an alternative embodiment, converter 30 and inverter 70 may be controlled by separate controllers, 60. As stated above controller(s) 60 provides control signals 62 to the switching devices of the inverter 70 to control generation of the of the motor command signals 75. Likewise, the controller 60 may provide control signals 62 to the active rectifier or converter 30 to control generation and maintenance of the DC voltage on the DC bus 38. Drive controller 60 may be implemented using a hybrid controller microprocessor (DSP) executing a computer program stored on a storage medium to perform the operations described herein and/or implemented in hardware (e.g., ASIC, FPGA). It should also be understood that the drive controller 60 may be a combination of hardware/software.

In operation, in embodiments employing an active rectifier/converter 30, the controller 60 develops a DC voltage command for the rectifier/converter 30 based on the operation of the motor 80 and the inverter 70 generating the motor command signals 75. The DC voltage command is then employed to formulate the PWM control commands 62 for the switching devices (not shown) of the rectifier/converter 30 to control the DC bus 34 accordingly. In addition, the controller 60 receives various input signals or values, including set point signals or values for desired output operation, such as DC bus 38 voltage, motor speed, position, torque, etc., as well as feedback signals or values representing operational values of various portions of the motor drive 20. In another embodiment, a passive rectifier configuration for the rectifier/converter 30 is employed and no PWM commands 62 from the controller 60 are needed. While such a configuration is advantageous because of its simplicity for employing passive rectifiers to supply the DC bus 38, other configurations with an active rectifier/converter 30 may be desirable for improved input current harmonics and electromagnetic interference (EMI) control. Likewise, the controller 60 develops a command for the inverter 70 based on the operation the motor 16 e.g., speed, torque, and the like and the inverter 70 generating the motor command signals 75. The command is then employed to formulate the PWM control commands 64 for the switching devices of the inverter 70 to formulate the motor command signals 75 accordingly. Conventionally a pulse width modulation (PWM) control scheme is employed to command the switching devices of the converter 30 to supply the DC bus and the inverter 70 to generate and control the motor command signals 75 to the motor 80 as is known in the art.

Figure 2A:
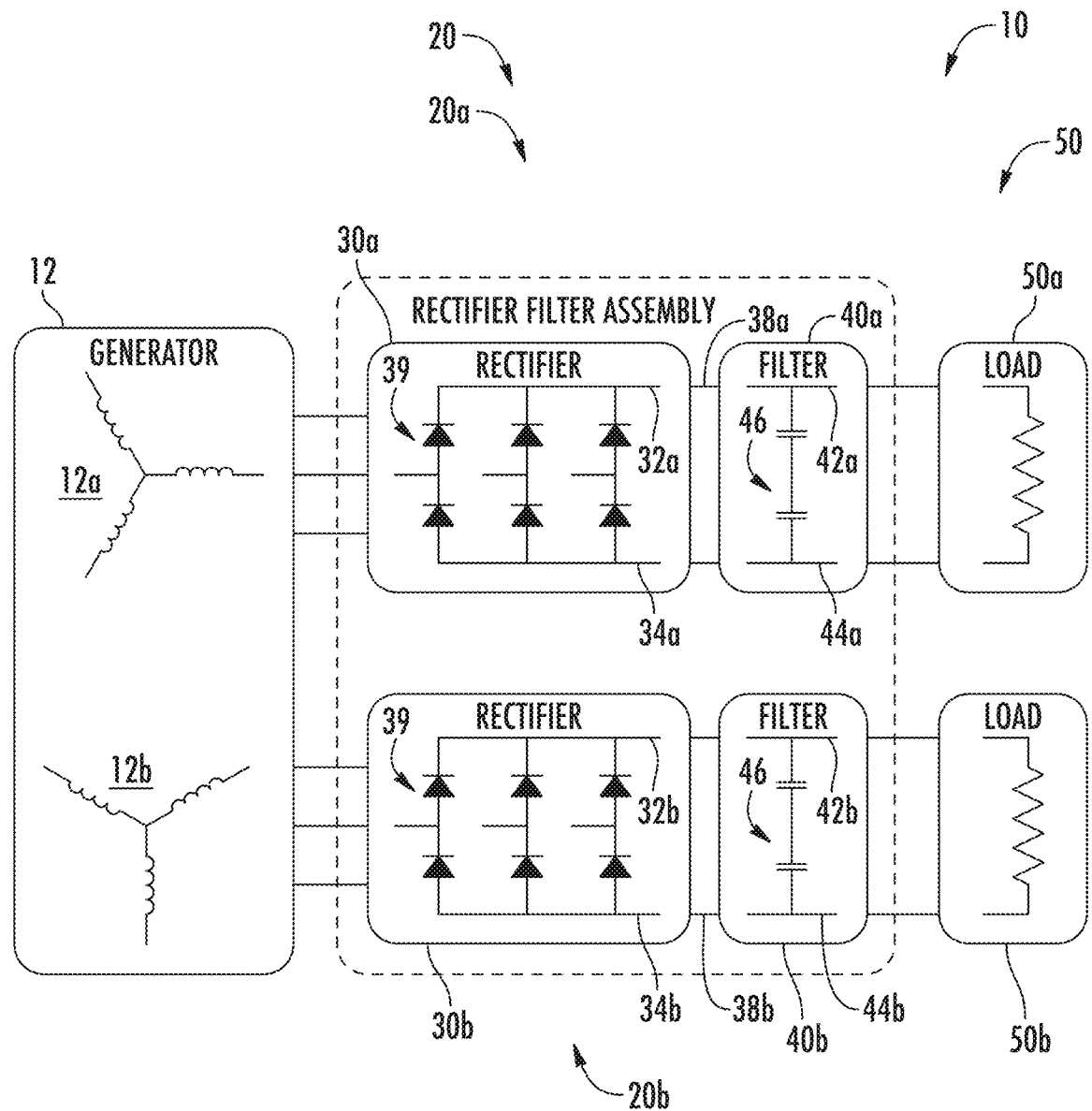
FIG. 2A shows a simplified schematic block diagram of two independent three-phase drives in accordance with an embodiment.

As shown in FIG. 2A, the power system 10 includes two separate and substantially independent drives shown generally as 20 and more particularly as 20a and 20b in accordance with an embodiment. The two drives 20a, 20b are powered by generator 12 shown having two separate windings denoted 12a and 12b. It should be appreciated that while shown separate, the generator windings 12, and 12b could be the same. The drives 20a and 20b also include a include a first rectifier/converter(s) denoted 30a and a second rectifier/converter denoted 30b driving a filter circuit shown generally as 40 and more particularly as first filter 40a and second filter 40b for the first DC bus 38a and second DC bus 38b respectively. In this embodiment, the rectifier 30a has positive terminal 32a and negative terminal 34a, and likewise the rectifier 30b has a positive terminal 32b and negative terminal 34b. To implement independent connections to supply the DC buses 38a and 38b, the positive terminal 32a of the first rectifier 30a is tied to the positive terminal 42a of the filter forming a positive terminal for the DC bus 38a. Likewise, the negative terminal 34a of the first rectifier 30a is tied to the negative terminal 44a of the first filter to form the negative terminal for the first DC bus 38a. Similarly, the positive terminal 32b of the second rectifier 30b is tied to the positive terminal 42a of the second filter 40b to form a positive terminal for the second DC bus 38b, and the negative terminal 34b for the second rectifier 30b is connected to the negative terminal 42b of the filter to form a negative terminal for the second DC bus 38b.

In this embodiment the filter network 40 is the combination of the filters 40a and 40b. In an embodiment the filters 40a is depicted as at least two capacitors shown generally as 46, in series between the positive terminal 44a and negative terminal of the DC bus 34a. Likewise, filter circuit 40b is depicted as at least two capacitors 46 in series as between the positive terminal 42b and 44b for the DC bus 34b. In both instances, the common point between the capacitors 46 may be grounded or not depending on the circuit configuration as is known in the art. It should also be understood that a variety of configurations are possible including a single capacitor 46, or a plurality of capacitors 46 between the positive and negative terminals 42a, 44a (or 42b, 44b) of the DC bus 34a, (34b). For example, in an embodiment the filter 40 includes four capacitors 46 configured as two sets in parallel of two capacitors 46 in series are employed. Finally, the power system 10 includes the load shown generally as 50 and more particularly as 50a and 50b supplied from each of the rectifier/converters 30a and 30b respectively. In an embodiment, the load 50 may include an inverter 70 (FIG. 1) configured to drive a motor 80 (FIG. 1).

Figure 2B:
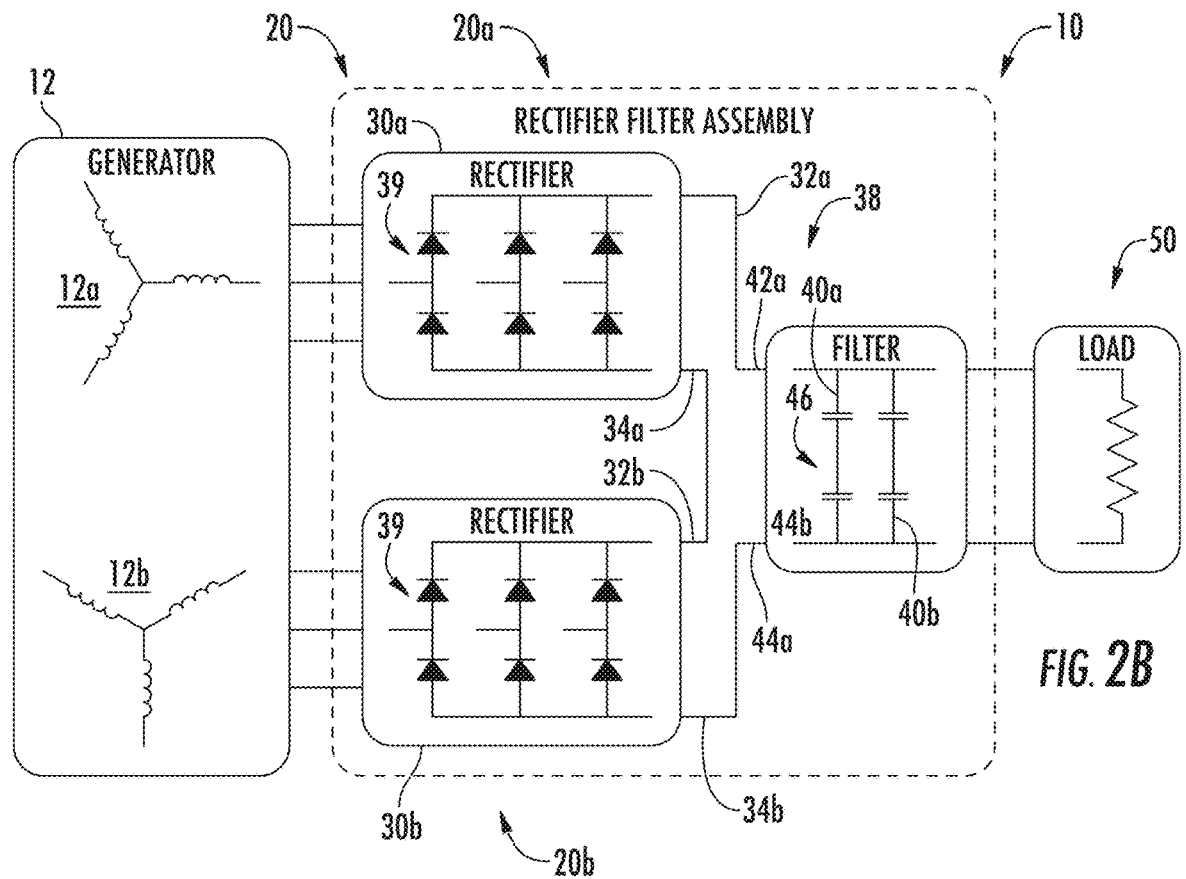
FIG. 2B shows a simplified schematic block diagram of two three-phase drives configured in series in accordance with an embodiment.

Turning now to FIG. 2B, the power system 10 includes two separate and independent drives shown generally as 20 and more particularly as 20a and 20b connected in series in accordance with another embodiment. The two drives 20a, 20b are powered by generator 12 shown having two separate windings denoted 12a and 12b. It should be appreciated that while shown separate, the generator windings 12, and 12b could be the same. The drives 20a and 20b once again include a rectifier/converter(s) 30a and 30b driving a filter circuit shown generally as 40 and more particularly as 40a and 40b for the DC bus 38. In this embodiment, the rectifier 30a has positive terminal 32a and negative terminal 34a, and likewise the rectifier 30b has a positive terminal 32b and negative terminal 34b. To implement a series connection to supply the DC bus 38, the positive terminal 32a of the first rectifier 30a is tied to the positive terminal 42a of the filter 40a, 40b forming a positive terminal for the DC bus 38. In addition, the negative terminal 34b for the second rectifier 30b is connected to the negative terminal 42b of the filter 40 to form a negative terminal for the DC bus 34. Finally, the positive terminal 32b of the second rectifier 30b is tied to the negative terminal 34a of the first rectifier 30a to place the two rectifiers in series. In this embodiment the filter network is the combination of the filters 40a and 40b.

Once again, in an embodiment the filter 40 (shown as 40a) is depicted as including at least two capacitors 46 in series between the positive terminal 44a and negative terminal of the DC bus 38. Likewise, filter circuit 40b is depicted as at least two capacitors 46 in series as between the positive terminal 42b and 44b for the DC bus 38. In both instances, the common point between the capacitors 46 may be grounded or not depending on the circuit configuration as described herein. Once again, it should also be understood that a variety of configurations are possible. Finally, the power system 10 includes the load shown generally as 50 and more particularly as 50a and 50b supplied from each of the rectifier/converters 30a and 30b respectively. In an embodiment, the load 50 may include an inverter 70 (FIG. 1) configured to drive a motor 80 (FIG. 1)., the power system 10 includes two separate and independent drives shown generally as 20 and more particularly as 20a and 20b connected in series in accordance with another embodiment. The two drives 20a, 20b are powered by generator 12 shown having two separate windings denoted 12a and 12b. It should be appreciated that while shown separate, the generator windings 12, and 12b could be the same. The drives 20a and 20b once again include a rectifier/converter(s) 30a and 30b driving a filter circuit shown generally as 40 and more particularly as 40a and 40b for the DC bus 34. In this embodiment, the rectifier 30a has positive terminal 32a and negative terminal 34a, and likewise the rectifier 30b has a positive terminal 32b and negative terminal 34b. To implement a series connection to supply the DC bus 38, the positive terminal 32a of the first rectifier 30a is tied to the positive terminal 42a of the filter 40a, 40b forming a positive terminal for the DC bus 38. In addition, the negative terminal 34b for the second rectifier 30b is connected to the negative terminal 42b of the filter 40 to form a negative terminal for the DC bus 38. Finally, the positive terminal 32b of the second rectifier 30b is tied to the negative terminal 34a of the first rectifier 30a. In this embodiment, the filter network is the combination of the filters 40a and 40b.

Once again, in an embodiment the filter 40 (shown as 40a) is depicted as including at least two capacitors 46 in series between the positive terminal 44a and negative terminal of the DC bus 38. Likewise, filter circuit 40b is depicted as at least two capacitors 46 in series as between the positive terminal 42b and 44b for the DC bus 38. In both instances, the common point between the capacitors 46 may be grounded or not depending on the circuit configuration as described herein. Once again, it should also be understood that a variety of configurations are possible. Finally, the power system 10 includes the load shown generally as 50 and more particularly as 50a and 50b supplied from each of the rectifier/converters 30a and 30b respectively. In an embodiment, the load 50 may include an inverter 70 (FIG. 1) configured to drive a motor 80 (FIG. 1).

Figure 2C:
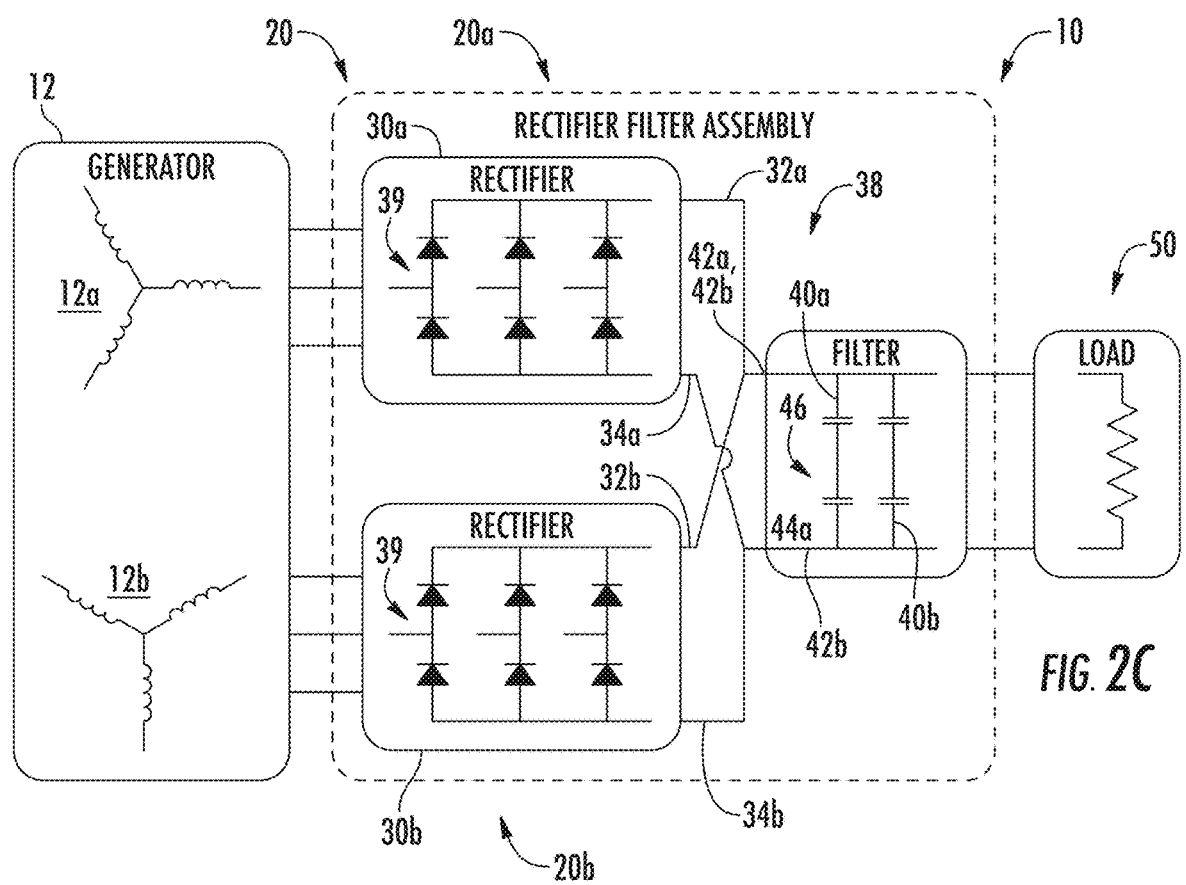
FIG. 2C shows a simplified schematic block diagram of two independent three-phase drives configured in parallel in accordance with an embodiment.

Turning now to FIG. 2C, the power system 10 includes two separate and independent drives shown generally as 20 and more particularly as 20a and 20b connected in parallel in accordance with yet another embodiment. The two drives 20a, 20b are powered by generator 12 shown having two separate windings denoted 12a and 12b. It should be appreciated that while shown separate, the generator windings 12, and 12b could be the same. The drives 20a and 20b once again include a rectifier/converter(s) 30a and 30b driving a filter circuit shown generally as 40 and more particularly as 40a and 40b for the DC bus 34. In this embodiment, the rectifier 30a has positive terminal 32a and negative terminal 34a, and likewise the rectifier 30b has a positive terminal 32b and negative terminal 34b. To implement a parallel connection to supply the DC bus 38, the positive terminal 32a of the first rectifier 30a is tied to the positive terminal 42a of the filter 40a, 40b forming a positive terminal for the DC bus 38. Likewise, the positive terminal 32b of the second rectifier 30b is tied to the positive terminal 42a of the filter 40a, 40b. In addition, the negative terminal 34a for the first rectifier 30a is connected to the negative terminal 42b of the filter 40 to form a negative terminal for the DC bus 38, likewise, the negative terminal 34b of the second rectifier/converter 30b is tied to the negative terminal 42b of the filter 40a, 40b. In this embodiment, the filter network is the combination of the filters 40a and 40b.

Once again, in an embodiment the filter 40 (shown as 40a) is depicted as including at least two capacitors 46 in series between the positive terminal 44a and negative terminal of the DC bus 38. Likewise, filter circuit 40b is depicted as at least two capacitors 46 in series as between the positive terminal 42b and 44b for the DC bus 38. In both instances, the common point between the capacitors 46 may be grounded or not depending on the circuit configuration as described herein. Once again, it should also be understood that a variety of configurations are possible. Finally, the power system 10 includes the load shown generally as 50 supplied from the combined outputs of the rectifier/converters 30a and 30b respectively. In an embodiment, the load 50 may include an inverter 70 (FIG. 1) configured to drive a motor 80 (FIG. 1).

Figure 3A:
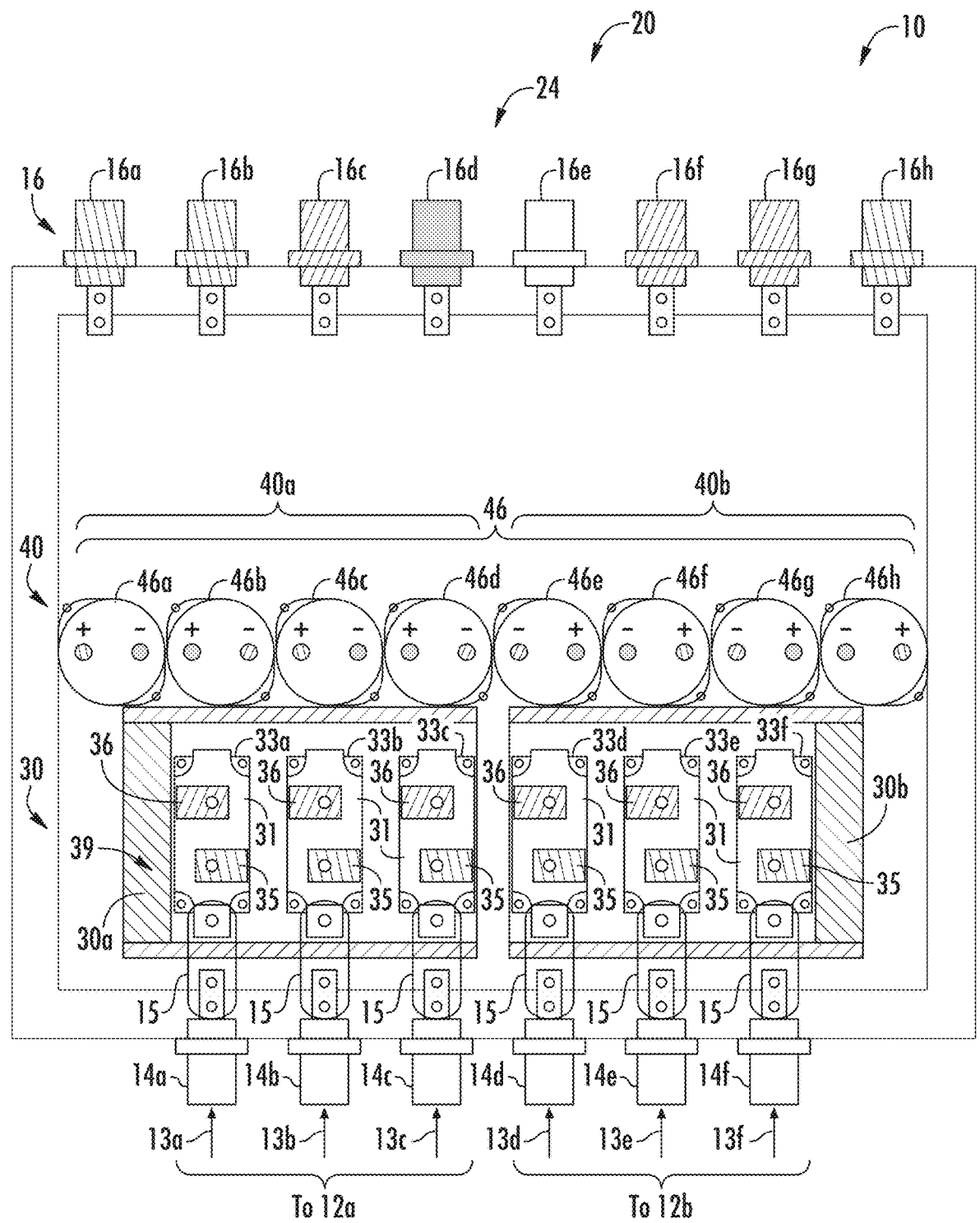
FIG. 3A illustrates a simplified layout of a reconfigurable three phase drive for two independent drives in accordance with an embodiment.
Figure 3B:
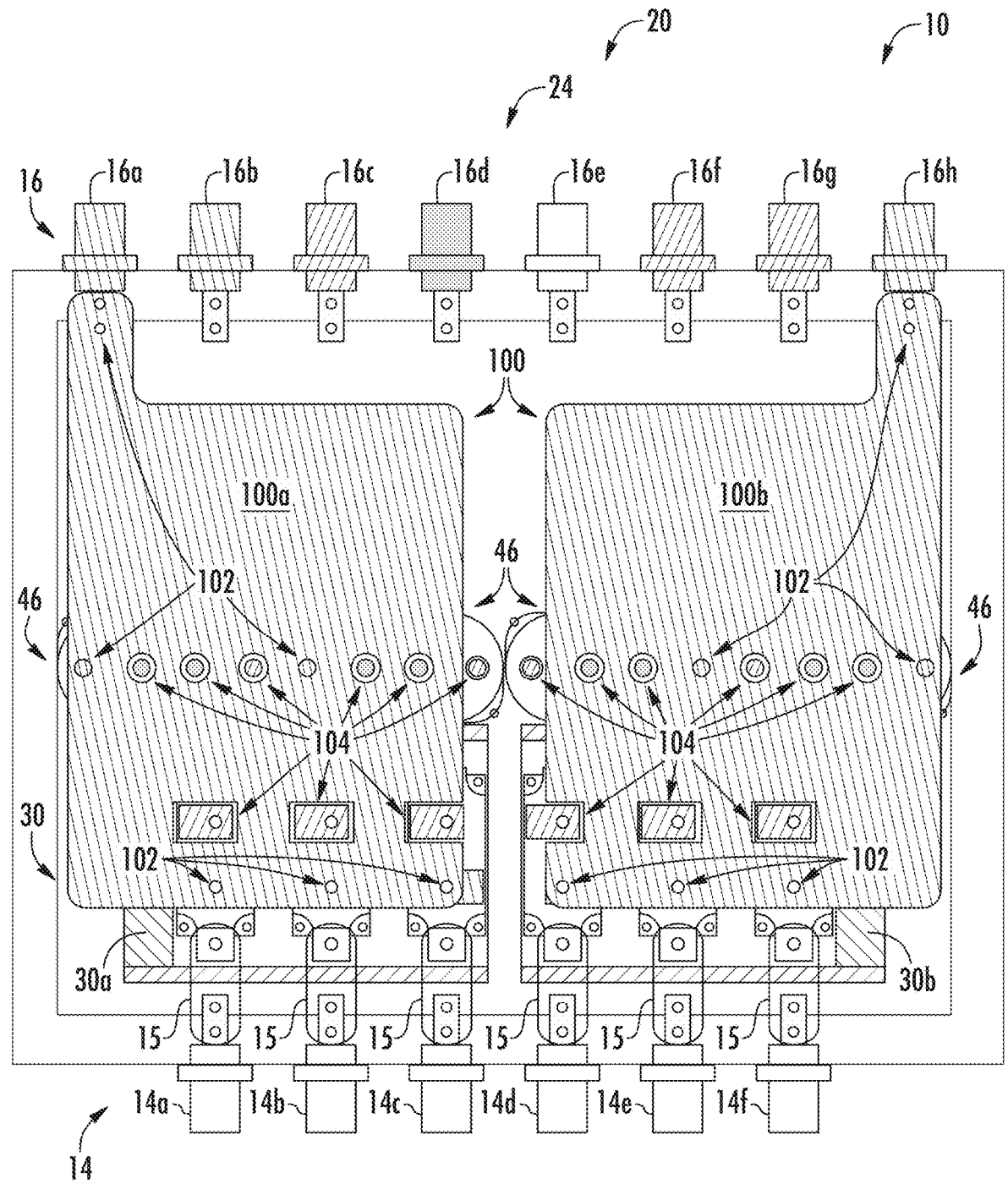
FIG. 3B illustrates a simplified layout of a reconfigurable three phase drive for two independent drives with a first and second positive rail adaptor plates in accordance with an embodiment.

FIG. 3A depicts a common or universal layout configuration shown generally as 24 and 24a for this embodiment for the power system 10 and specifically the drive assembly 20 e.g., 20a, 20b including rectifier/converter 30, (e.g., 30a, 30b) and filter 40 (e.g., 40a, 40b). This base layout configuration 24 is employed for each of the three configurations of the drive assembly 20, whether configured as two independent drives, in series, or in parallel. In an embodiment, a layout 24 is described with a common set of power input connections shown generally as 14 and more specifically as 14a, 14b, and 14c for drive 20a and 14d, 14e, and 14f for drive 20b for application of power from the power source(s) 12 and more specifically 12a, and 12b. The power signals shown generally as 13 and more specifically as 13a, 13b, and 13ac, as well as 13d, 13e, and 13f for each phase of a three-phase input. The power signals 13a, 13b, 13c and 13d, 13e, and 13f are coupled via bus bar 15 (6 places) to a common point(s) 31 of a rectifier/converter leg(s) 33. Each designated generally as 33, and more specifically as 33a, 33b, 33c, as well as 33d, 33e, and 33f. Each rectifier/converter leg 33 (e.g., 33a, 33b, 33c, as well as 33d, 33e, and 330 comprising two diodes or switching devices (for the case of an active rectifier or converter), shown generally as 39, having the common point(s) 31 and each having a positive terminal 35 and a negative terminal 36, the positive terminal(s) 35 each operably connected to the positive terminal 32 (i.e., 32a, 32b) of the rectifier 30 and the negative end 36 is connected to the negative terminal 34 (i.e., 34a, 34b). Also depicted in FIG. 3A are the capacitors 46 (e.g., 46a-46h) of the filter 40, and in particular 40a, and

40*b*. As depicted in the figure, eight capacitors 46 are shown. In an embodiment the capacitors 46 are arranged and connected as described herein to form the filter 40 and more particularly 40*a*, 40*b*.

In an embodiment, the configurability of the power system 10 and more particularly the rectifier/converter 30 and filter 40 is facilitated by the use of a plurality of adaptable and configurable power distribution plates or buss bars adapted to provide the electrical and physical connections between the rectifiers 30, filter 40, and output connections shown generally as 16. The configuration of the various adaptable and configurable power distribution plates or buss bars facilitate reconfiguring the power system and in particular the rectifier/converter 30 and filter to provide for the three configurations. FIGS. 3A-3D depict the configuration for two separate rectifiers/converters configured to provide power to two separate loads e.g., 50*a* and 50*b*. FIGS. 3E-3G depict the configuration for the two rectifiers/converters 30*a*, 30*b* and filters 40*a*, 40*b* arranged in series and configured to provide power to single load e.g., 50 (of potentially higher voltage). Finally, FIGS. 3H-3K depict the configuration for the two rectifiers/converters 30*a*, 30*b* and filters 40*a*, 40*b* arranged in parallel and configured to provide power to single load e.g., 50 (of potentially higher current requirement).

Continuing with FIG. 3A, in an embodiment, a first positive rail adapter plate 100*a* is configured to with connections 102 at selected locations depicted by the arrows to enable connections to selected components (e.g., the capacitors 46 an diodes of the rectifier 30*a*) in the system 10, while cutouts 104 provide clearance relative to connection points on components depicted by the arrows to enable other connections to selected components (e.g., the capacitors 46 an diodes of the rectifier 30*a*) in the system 10 that are not to be connected to the first adapter plate 100*a*. For example, in an embodiment, the first positive rail adapter plate 100*a* is configured to connect the positive terminal 35 of each rectifier/converter leg 33 (e.g., 33*a*, 33*b*, and 33*c* associated with the first rectifier 30*a*. In addition, the first positive rail adapter plate 100*a* also connects with a positive terminal of selected capacitors 46 of the filter 40*a*. In an embodiment, two of the eight capacitors are employed. Finally, the first positive rail adapter plate 100*a* also includes a connection 102 to a first output connector 16 corresponding to the positive terminal of the DC Bus 38 to supply the load 50 (e.g., 50*a*).

In addition, a second positive rail adapter plate 100*b* is employed. The second positive rail adapter plate 100*b* is substantially identical to the first positive rail adapter plate 100*a*, but employed "flipped over", with the plate including the connections 102 and holes and cutouts 104 described herein in a essentially mirror image orientation of that described herein with respect to the first positive rail adapter plate 100*a*. That is, in this instance, the second positive rail adapter plate 100*b* provides for connections to the positive terminal 35 of each rectifier/converter leg 33 (e.g., 33*d*, 33*e*, and 33*f* associated with the second rectifier 30*b*. In addition, the second adapter plate 100*b* also connects with a positive terminal of selected capacitors 46 of the filter 40*b*. In an embodiment, once again, two of the eight capacitors 46 are employed. Finally, the second positive rail adapter plate 100*b* also includes connections 102 to an eighth output connector 16*h* corresponding to the positive terminal of the second DC Bus 38*b* to supply the second load 50 (e.g., 50*b*). It should be appreciated that while the second positive rail adapter plate 100*b* is described as effectively a mirror image of the first positive rail adapter plate, such description is merely illustrative and for the purposes of readily describing the embodiment. Once again it should be appreciated that the described embodiments could be rearranged as needed without departing from the scope of the claims.

Figure 3C:
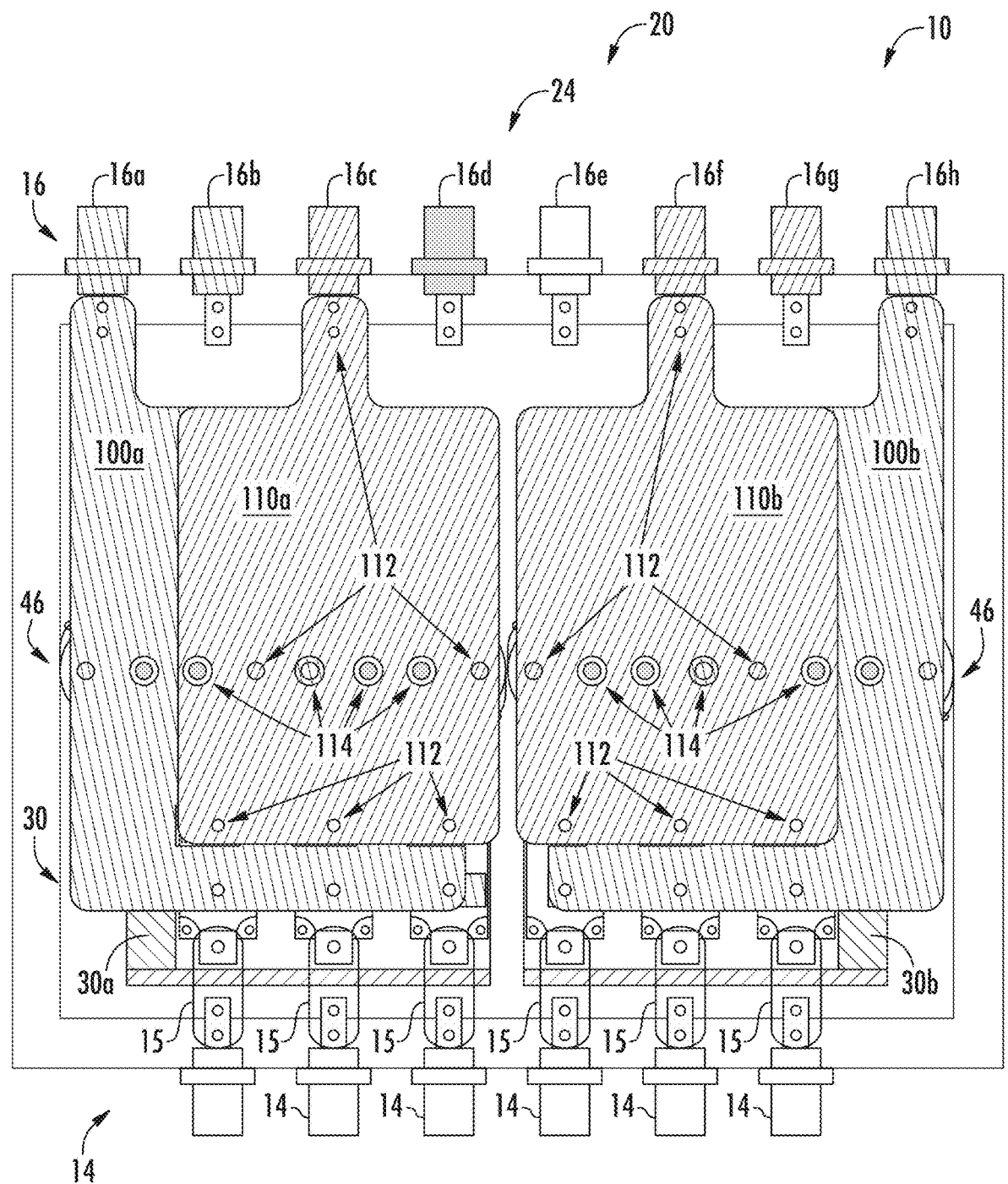
FIG. 3C illustrates a simplified layout of a reconfigurable three phase drive for two independent drives with a first and second negative rail adaptor plates in accordance with an embodiment.

Turning now to FIG. 3C as well, which depicts the rectifier assembly 20 and more particularly a first negative rail adapter plate 110*a*. In an embodiment, a first negative rail adapter plate 110*a* is mounted over the first positive rail adaptor plate 100*a* and configured to with connections 112 at selected locations depicted by the arrows to enable connections to selected components (e.g., the capacitors 46 an diodes of the rectifier 30*a*) in the system 10, while cutouts 114 provide clearance relative to connection points on components depicted by the arrows to enable other connections to selected components (e.g., the positive rail adapter plate 100*a*, the capacitors 46 and diodes of the rectifier 30*a*) in the system 10 that are not to be connected to the first positive rail adapter plate 100*a*. For example, in an embodiment, the first negative rail adapter plate 110*a* is configured to connect the negative terminal 36 of each rectifier/converter leg 33 (e.g., 33*a*, 33*b*, and 33*c* associated with the first rectifier 30*a*. In addition, the first negative rail adapter plate 110*a* also connects with a negative terminal of selected capacitors 46 of the filter 40*a*. In an embodiment, connections 112 to two of the eight capacitors are employed. Finally, the first negative rail adapter plate 100 also includes a connection 112 to an output connector 16 corresponding to the negative terminal 34*a* of the DC Bus 38*a* to supply the load 50 (e.g., 50*a*).

In addition, a second negative rail adapter plate 110*b* is employed. The second negative rail adapter plate 110*b* is substantially identical to the first negative rail adapter plate 110*a*, but employed flipped over, with the plate 110*b* including the connections 112 and holes and cutouts 114 described herein, but in essentially a mirror image orientation of that described herein with respect to the first negative rail adapter plate 110*a*. That is, in this instance, the second positive rail adapter plate 110*b* provides for connections to the negative terminal 36 of each rectifier/converter leg 33 (e.g., 33*d*, 33*e*, and 33*f* associated with the second rectifier 30*b*. In addition, the second negative rail adapter plate 110*b* also connects with a negative terminal of selected capacitors 46 of the filter 40*b*. In an embodiment, once again, two of the eight capacitors 46 are employed. Finally, the second negative rail adapter plate 110*b* also includes connections 112 to an output connector 16*f* corresponding to a negative terminal of the second DC Bus 38*b* to supply the second load 50 (e.g., 50*b*). It should be appreciated that while the second negative rail adapter plate 100*b* is described as effectively a mirror image of the first negative rail adapter plate, such description is merely illustrative and for the purposes of readily describing the embodiment. Once again it should be appreciated that the described embodiments could be rearranged as needed without departing from the scope of the claims.

Figure 3D:
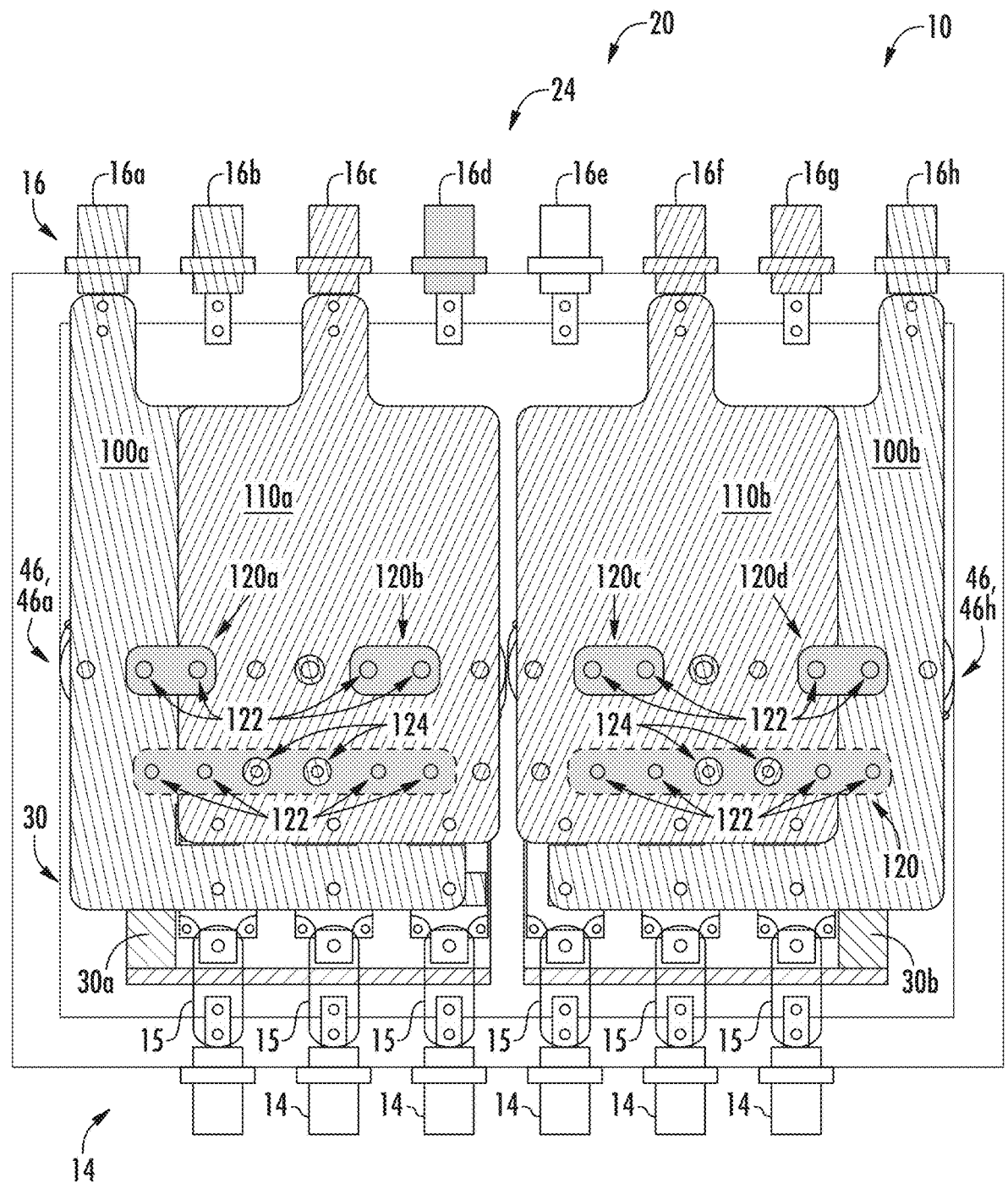
FIG. 3D illustrates a simplified layout of a reconfigurable three phase drive for two independent drives with a filter bus adaptor plate(s) in accordance with an embodiment.
Figure 3E:
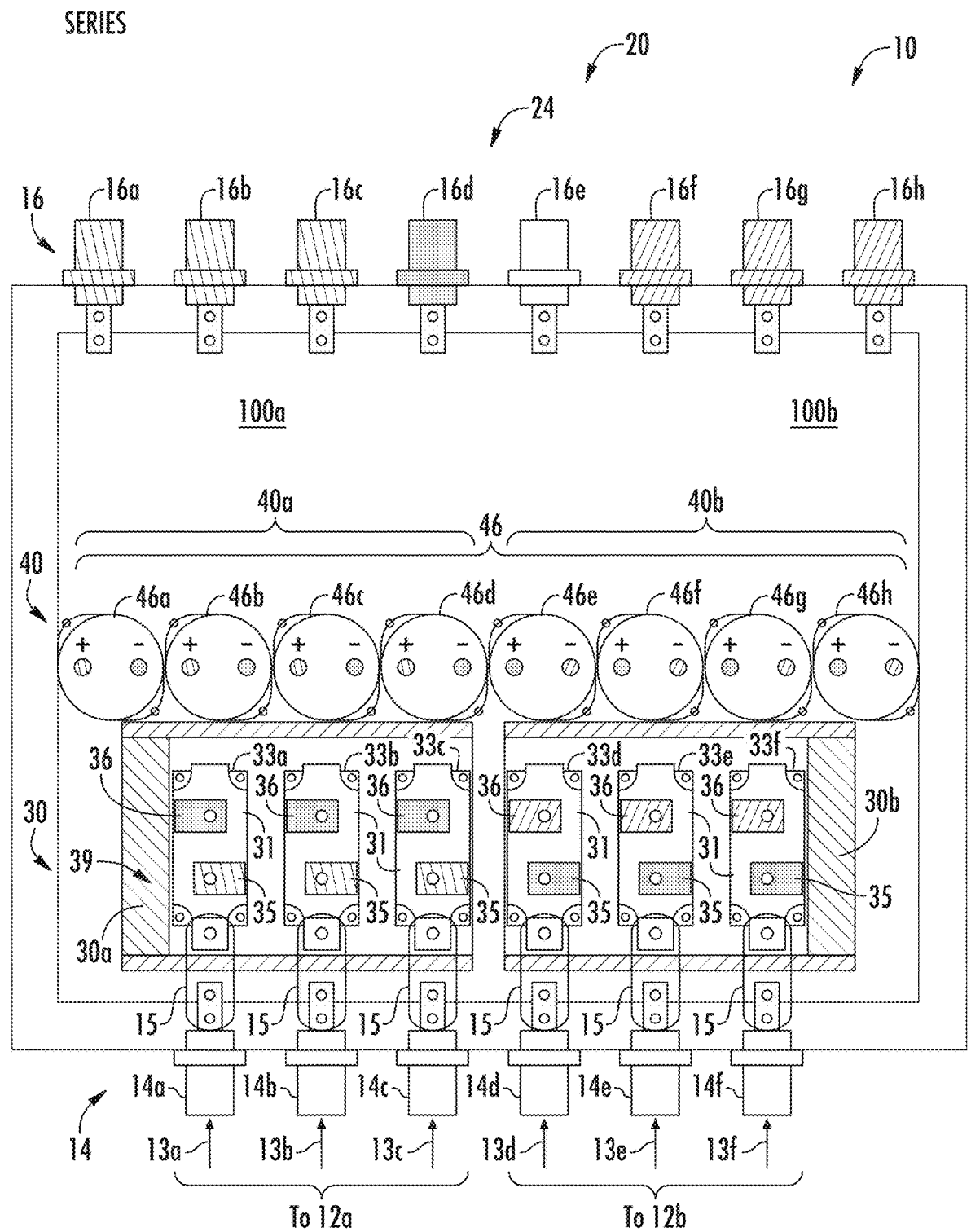
FIG. 3E illustrates a simplified layout of a reconfigurable three phase drive for two drives configured in series in accordance with an embodiment.
Figure 3F:
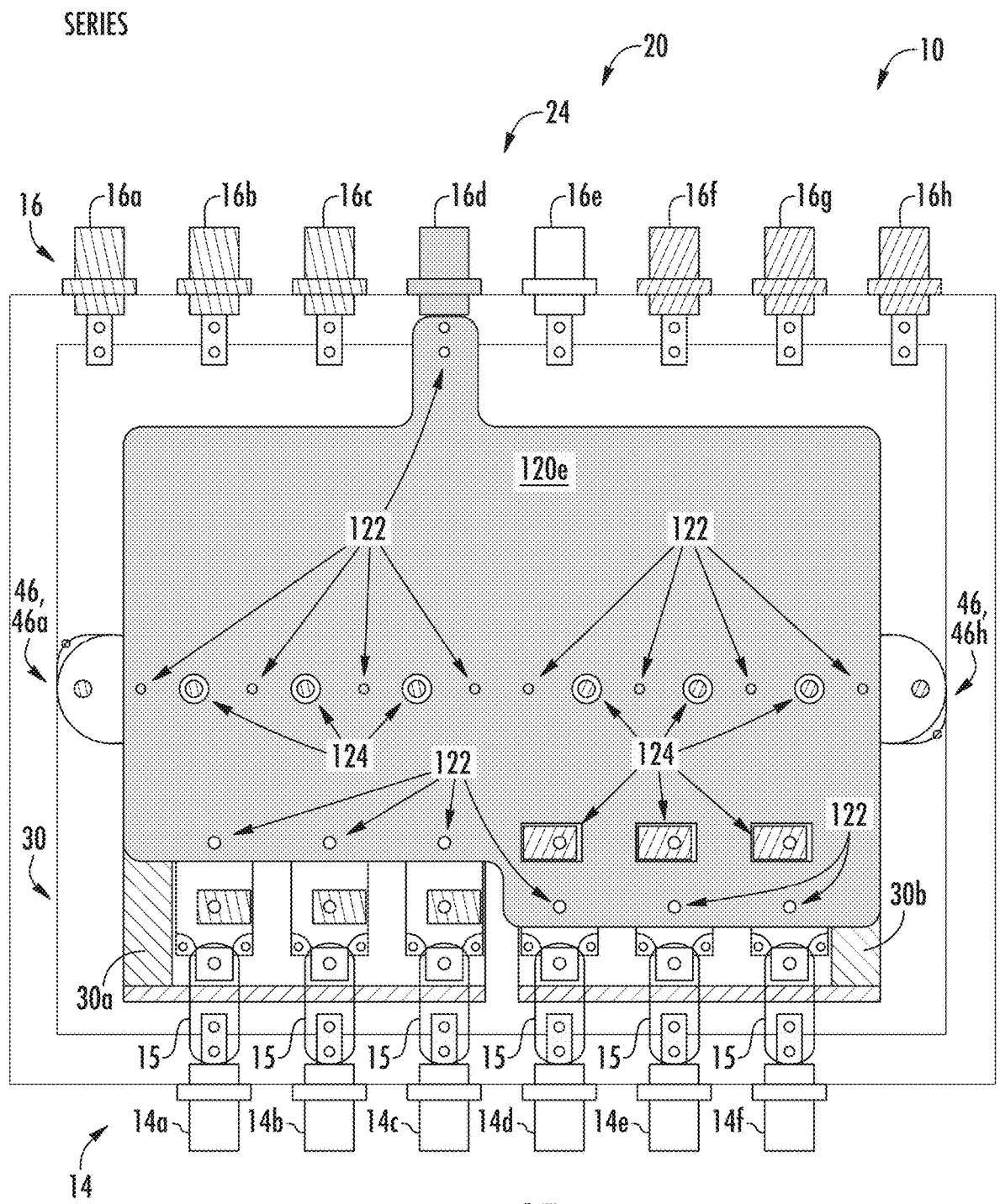
FIG. 3F illustrates a simplified layout of a reconfigurable three phase drive for two drives configured in series with a filter bus adaptor plate in accordance with an embodiment.
Figure 3G:
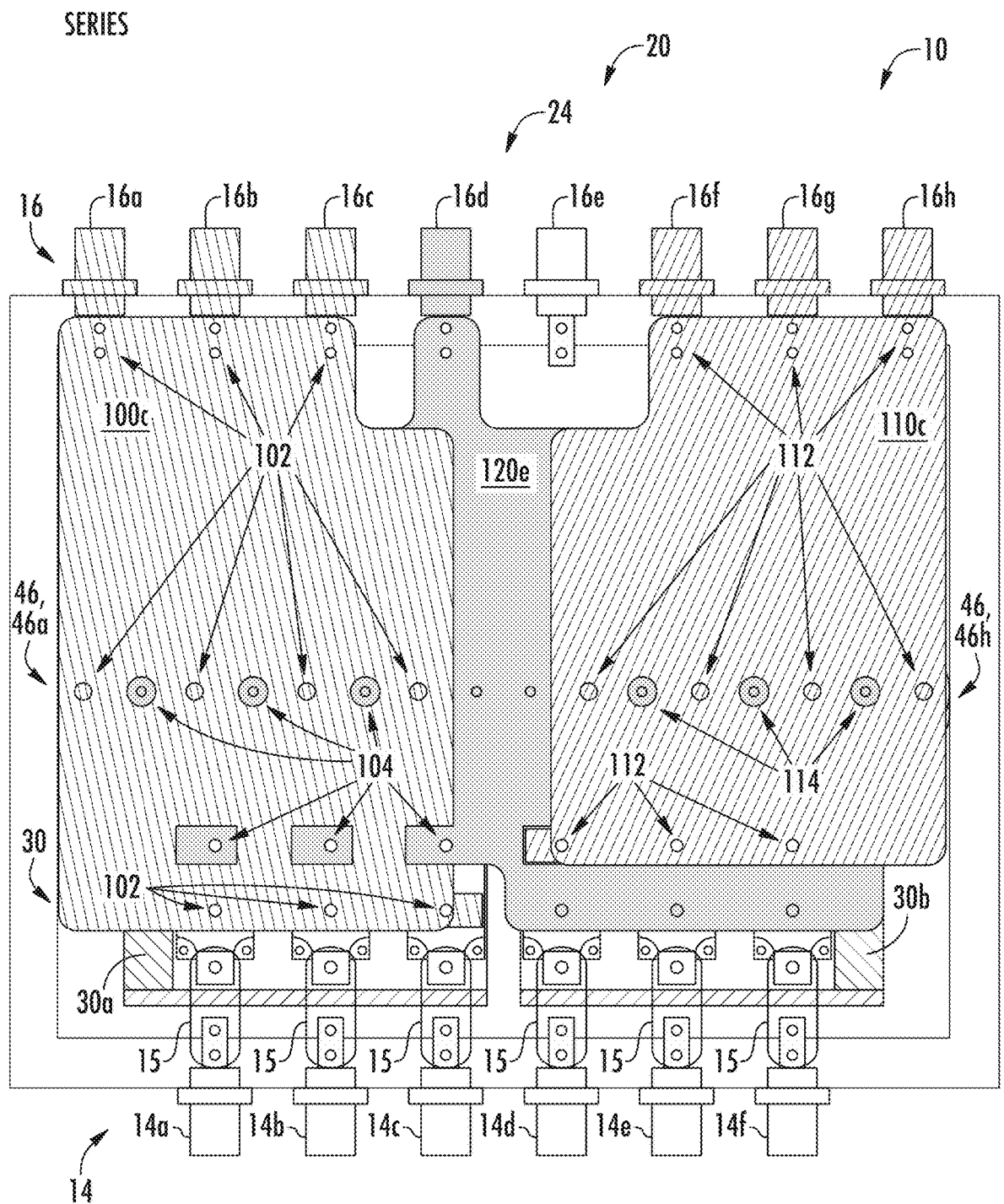
FIG. 3G illustrates a simplified layout of a reconfigurable three phase drive for two drives configured in series with a third positive rail adaptor plate and third negative rail adaptor plate in accordance with an embodiment.

Turning now to FIG. 3D as well, which depicts the rectifier assembly 20 and more particularly a first filter bus plate 120*a*. In an embodiment, a first filter bus plate 120*a* is mounted over the first negative rail adaptor plate 110*a* and configured to with connections 112 at selected locations depicted by the arrows to enable connections to selected components (e.g., the capacitors 46) in the system 10. For example, in an embodiment, the first filter bus plate 120*a* is configured to connect the negative terminal on a first capacitor 46*a* with the positive terminal of a second capacitor 46*b* the first filter 40*a*. In addition, a second filter bus plate 120*b* also includes connections 122 to a negative terminal of selected capacitors 46 (the third 46c) of the filter 40a with a positive terminal of a fourth capacitor 46d (see FIG. 3A).

In addition, in an embodiment, a third filter bus plate 120c and fourth filter bus plate 120d is mounted over the second negative rail adaptor plate 110b and configured to with connections 122 at selected locations depicted by the arrows to enable connections to selected components (e.g., the capacitors 46) in the system 10. For example, in an embodiment, the third filter bus plate 120c is configured to connect the negative terminal on a fifth capacitor 46e with the positive terminal of a sixth (neither visible in this view) capacitor 46f the second filter 40b. In addition, a fourth filter bus plate 120d also includes connections 122 to a negative terminal of selected capacitors 46 (the seventh 46g) of the second filter 40b with a positive terminal of a eighth capacitor 46 (shown as 46h). It should be appreciated that in this embodiment, while the filter bus plate 120 is described as four small bus bars connecting select terminals of the plurality of capacitors 46, it very well have been a single bus bar 120 with connections as described herein and cutouts 124 to provide clearance for the nonconnections.

In this manner, the schematic of FIG. 2A is implemented to provide for two independent drives 20a and 20b with respective rectifier/converters 30a and 30b and filters 40a and 40b. Drive 20a is configured with three phase AC power signal inputs 13a, 13b, and 13c on connections 14a, 14b, and 14c respectively and DC output on terminal 16a relative to ground connection 16d. Similarly, drive 20b is configured with three phase AC power signal inputs 13d, 13e, and 13f on connections 14d, 14e, and 14f respectively, as well as DC output on terminal 16b relative to ground connection 16d.

Continuing with FIGS. 3A-3K, FIG. 3E depicts a common or universal layout 24, denoted 24b in this instance, configuration for the power system 20 and specifically the rectifier/converter 30, (e.g., 30a, 30b) and filter 40 (e.g., 40a, 40b). In an embodiment, once again the layout 24b is escribed with a common set of power input connections 14a-14f as described herein with respect to FIG. 3A for application of power from the power source(s) 12 and more specifically 12a, and 12b. Also depicted in FIG. 3A are the capacitors 46 of the filter 40, and in particular 40a, and 40b. As depicted in the figure, once again, eight capacitors 46a-46h are shown. In an embodiment the capacitors 46 are arranged and connected (slightly differently than with respect to FIG. 3A) as described herein to form the filter 40 and more particularly 40a, 40b.

Continuing with FIG. 3E, and turning now to FIG. 3F, in an embodiment, once again a plurality of adaptable and configurable power distribution plates or buss bars adapted to provide the electrical and physical connections between the rectifiers 30, filter 40, and output connections shown generally as 16 an particularly 16d in this instance. In this embodiment, the arrangement of the various adapter plates e.g., 100, 110, and 120 is modified to facilitate the formation and arrangement of the drives 20a and 20b in series. In this embodiment, a fifth filter bus plate denoted 120e for the two drives 20a and 20b is established. The filter bus plate 120e is arranged as a common point that connects the positive rail connection points (from the embodiment above) of the second drive 20b to the negative rail (from the embodiment above) connecting points of the first drive 20a to facilitate the series connection of drives 20a, and 20b by virtue of placing the first rectifier/converter 30a and filter 40a in series with the second drive 20b, and its rectifier/converter 30b and filter 40b.

FIG. 3F depicts the rectifier assembly 20 and more particularly a fifth filter bus plate 120e. In this embodiment, the filter bus plate 120a is mounted first (instead of last as described with the other embodiments as described herein), and is configured to with connections 122 at selected locations depicted by the arrows to enable connections to selected components (e.g., the capacitors 46 and diodes 39 of the rectifier 30a and 30b) in the system 10. While cutouts 124, provide clearance relative to connection points on components (e.g. rectifiers 30 and capacitors 46) as needed and depicted by the arrows to enable connections other plates 100, 110 through the fifth filter plate 120e to selected components (e.g., particular terminals on the capacitors 46 an diodes 39 of the rectifier 30a, 30b) in the system 10. For example, in an embodiment, the fifth filter bus plate 120e is configured to connect together the positive terminals 35 (FIG. 3A) on the rectifier 30b with the negative terminals 36 (FIG. 3A) on the rectifier 30a. In addition, the fifth filter bus plate 120e is configured to connect together the negative terminals on a capacitor(s) 46a, 46b, 46c 46d with the positive terminals of capacitor 46e, 46f, 46g, and 46h the first filter 40a to implement the series connection of the filters 40a and 40b.

Turning now to FIG. 3G, for continued assembly of the drive 20 and in particular the series connection of drives 20a and 20b. In an embodiment, a third positive rail adapter plate 100c is mounted over the fifth filter bus rail adaptor plate 120e. The third positive rail adapter plate 100c is configured to with connections 102 at selected locations depicted by the arrows to enable connections to selected components (e.g., the positive terminals of the capacitors 46 an diodes of the rectifier 30a) in the system 10, while cutouts 104 provide clearance relative to connection points on components depicted by the arrows to enable other connections to selected components (e.g., the capacitors 46 an diodes of the rectifier 30a) in the system 10 that are not to be connected to the first adapter plate 100a. For example, in an embodiment, the third positive rail adapter plate 100c is configured to connect the positive terminal 35 of each rectifier/converter leg 33 (e.g., 33a, 33b, and 33c associated with the first rectifier 30a. In addition, the first positive rail adapter plate 100a also connects with a positive terminal of selected capacitors 46 of the filter 40a. In an embodiment, two of the eight capacitors are employed. Finally, the first positive rail adapter plate 100a also includes a connection 102 to a first output connector 16 corresponding to the positive terminal of the DC Bus 38 to supply the load 50 (e.g., 50a).

Continuing with FIG. 3G, which depicts the rectifier assembly 20 and more particularly a third negative rail adapter plate 110c. In an embodiment, the third negative rail adapter plate 110c is mounted over the fifth filter bus rail adaptor plate 100a and configured to with connections 112 at selected locations depicted by the arrows to enable connections to selected components (e.g., the capacitors 46 an diodes of the rectifier 30a) in the system 10, while cutouts 114 provide clearance relative to connection points on components depicted by the arrows to enable other connections to selected components (e.g., the positive rail adapter plate 100a, the capacitors 46 and diodes of the rectifier 30a) in the system 10 that are not to be connected to the first positive rail adapter plate 100a. For example, in an embodiment, the third negative rail adapter plate 110c is configured to connect the negative terminal 36 of each rectifier/converter leg 33 (e.g., 33a, 33b, and 33c associated with the first rectifier 30a. In addition, the third negative rail adapter plate 110c also connects with a negative terminal of selected capacitors 46 of the filter 40a. In an embodiment, connections 112 to four of the eight capacitors e.g. 46e, 46f, 46g, and 46h are employed. Finally, the third negative rail adapter plate 110c also includes a connection 112 to an output connector 16, more specifically 16f, 16g, and 16h in this instance corresponding to the negative terminal 34a of the DC Bus 38a to supply the load 50 (e.g., 50a).

In this manner, the schematic of FIG. 2B is implemented to provide for two series connected drives 20a and 20b with respective rectifier/converters 30a and 30b and filters 40a and 40b. Drive 20a is configured with three phase AC power signal inputs 13a, 13b, and 13c on connections 14a, 14b, and 14c respectively and DC output on terminal 16a relative to ground connection 16d. Similarly, drive 20b is configured with three phase AC power signal inputs 13d, 13e, and 13f on connections 14d, 14e, and 14f respectively, as well as DC output on terminal 16b relative to ground connection 16d.

Figure 3H:
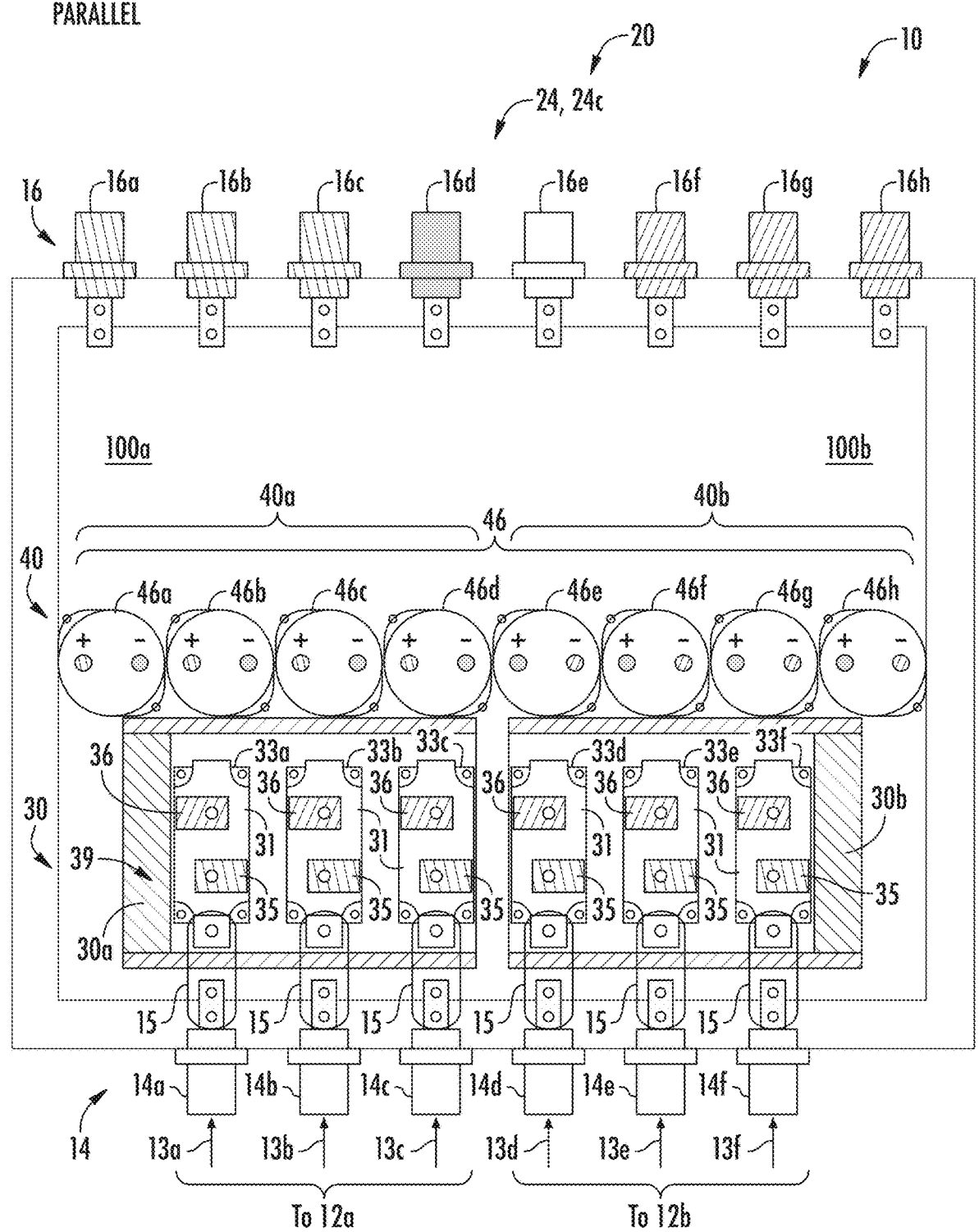
FIG. 3H illustrates a simplified layout of a reconfigurable three phase drive for two drives configured in parallel in accordance with an embodiment.

Continuing with FIGS. 3A-3K, FIG. 3H depicts a common or universal layout 24, denoted 24c in this instance, configuration for the power system 20 and specifically the rectifier/converter 30, (e.g., 30a, 30b) and filter 40 (e.g., 40a, 40b). In an embodiment, once again the layout 24b is escribed with a common set of power input connections 14a-14f as described herein with respect to FIG. 3A or FIG. 3E for application of power from the power source(s) 12 and more specifically 12a, and 12b. Also depicted in FIG. 3H are the capacitors 46 of the filter 40, and in particular 40a, and 40b. As depicted in the figure, once again, eight capacitors 46a-46h are shown. In an embodiment, the capacitors 46 are arranged and connected (once again, slightly differently than with respect to FIG. 3A or FIG. 3E) as described herein to form the filter 40 and more particularly 40a, 40b.

Figure 3I:
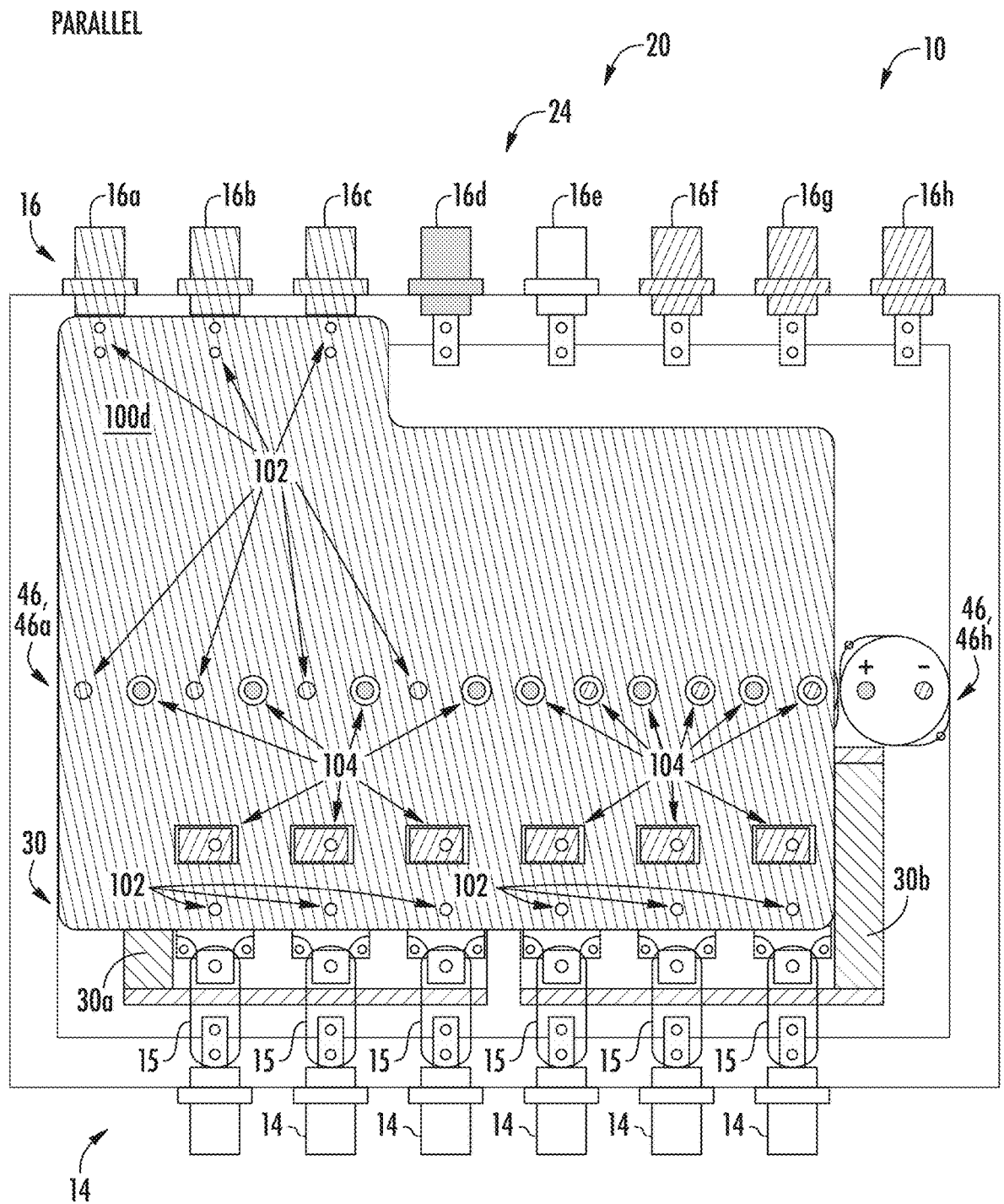
FIG. 3I illustrates a simplified layout of a reconfigurable three phase drive for two drives configured in parallel with a fourth positive rail adaptor plate in accordance with an embodiment.

Continuing with FIG. 3H, and turning now to FIG. 3I, in an embodiment, once again a plurality of adaptable and configurable power distribution plates or buss bars adapted to provide the electrical and physical connections between the rectifiers 30, filter 40, and output connections shown generally as 16 an particularly 16d in this instance. In this embodiment, the arrangement of the various adapter plates e.g., 100, 110, and 120 is modified to facilitate the formation and arrangement of the drives 20a and 20b in parallel. In an embodiment, a fourth positive rail adapter plate 100d is mounted with connections 102 at selected locations depicted by the arrows to enable connections to selected components (e.g., the positive terminals of the capacitors 46 and diodes of the rectifier 30a) in the system 10, while cutouts 104 provide clearance relative to connection points on components depicted by the arrows to enable other connections to selected components (e.g., the capacitors 46 an diodes of the rectifier 30a) in the system 10 that are not to be connected to the fourth positive rail adapter plate 100d. For example, in an embodiment, the fourth positive rail adapter plate 100d is configured to connect the positive terminal 35 of each rectifier/converter leg 33 (e.g., 33a, 33b, 33c 33d, 33e, and 33f, associated with the first rectifier 30a and second rectifier 30b respectively. In addition, the first positive rail adapter plate 100a also connects with a positive terminal of selected capacitors 46 of the filter 40a. In an embodiment, four of the eight capacitors 46 are employed. Finally, the fourth positive rail adapter plate 100d also includes a connection 102 to a first output connector 16, more specifically 16a, 16b, and 16c corresponding to the positive terminal of the DC Bus 38 to supply the load 50 (e.g., 50a).

Figure 3J:
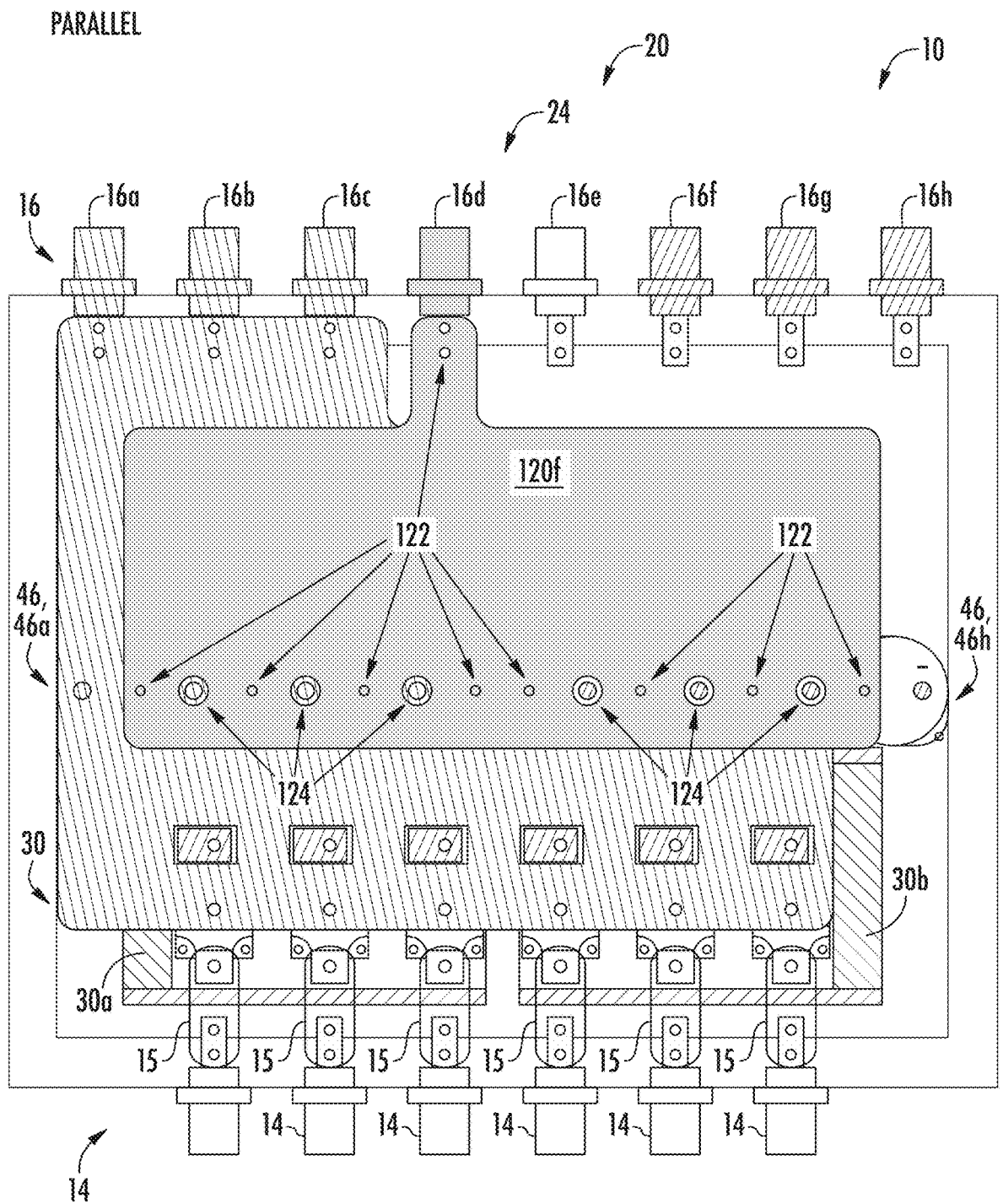
FIG. 3J illustrates a simplified layout of a reconfigurable three phase drive for two drives configured in parallel with a fourth negative rail adaptor plate in accordance with an embodiment.

Turning now to FIG. 3J, in this embodiment, a sixth filter bus plate denoted 120f for the two drives 20a and 20b is established. The sixth filter bus plate 120f is arranged with connections 122 at selected locations depicted by the arrows to enable connections to selected components (e.g., the capacitors 46) in the system 10. While cutouts 124, provide clearance relative to connection points on components (e.g. capacitors 46) as needed and depicted by the arrows to enable connections other plates 100, 110 through the sixth filter plate 120f to selected components (e.g., particular terminals on the capacitors 46) in the system 10. For example, in an embodiment, the sixth filter bus plate 120f is configured to connect together the negative terminals on capacitor(s) 46a, 46b, 46c 46d of the first filter 40a, with the positive terminals of capacitors 46e, 46f, 46g, and 46h the first filter 40a to implement the series connection of the filters 40a and 40b.

Figure 3K:
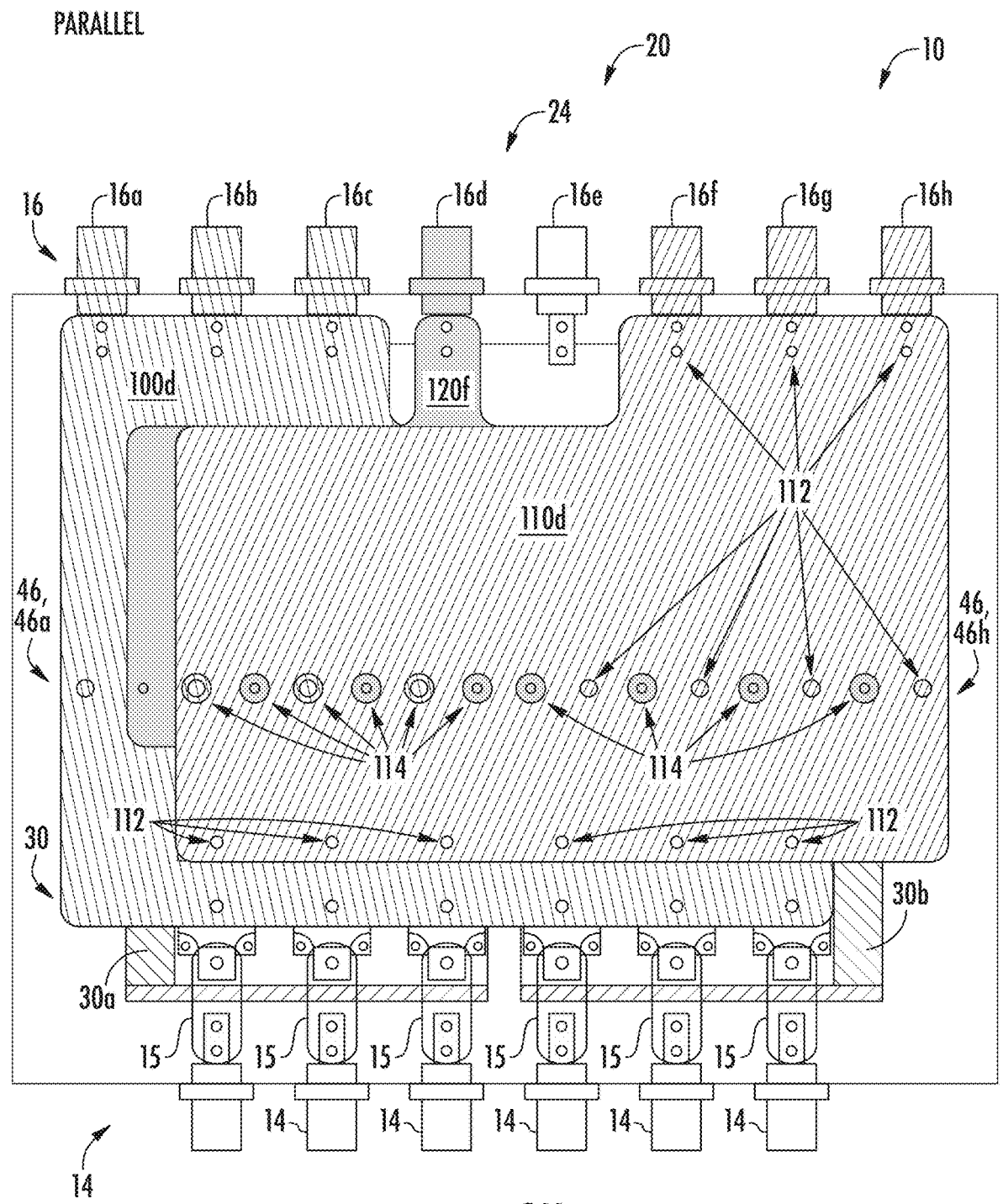
FIG. 3K illustrates a simplified layout of a reconfigurable three phase drive for two drives configured in parallel a filter bus adaptor plate in accordance with an embodiment.

Continuing with FIG. 3K, which depicts the rectifier assembly 20 and more particularly a fourth negative rail adapter plate 110d. In an embodiment, the fourth negative rail adapter plate 110d is mounted over the sixth filter bus rail adaptor plate 120f and configured to with connections 112 at selected locations depicted by the arrows to enable connections to selected components (e.g., the capacitors 46 and diodes of the rectifier 30a and 30b) in the system 10, while cutouts 114 provide clearance relative to connection points on components depicted by the arrows to enable other connections to selected components (e.g., the positive rail adapter plate 100d, the capacitors 46 and diodes of the rectifier 30a and 30b) in the system 10 that are not to be connected to the fourth positive rail adapter plate 100d. For example, in an embodiment, the fourth negative rail adapter plate 110b is configured to connect the negative terminals 36 of each rectifier/converter leg 33 (e.g., 33a-33f) associated with the first rectifier 30a and second rectifier 30b. In addition, the fourth negative rail adapter plate 110d also connects with a negative terminal of selected capacitors 46 of the filter 40b. In an embodiment, connections 112 to four of the eight capacitors e.g. 46e, 46f, 46g, and 46h are employed. Finally, the fourth negative rail adapter plate 110d also includes a connection 112 to an output connector 16, more specifically 16f, 16g, and 16h in this instance corresponding to the negative terminal 34a of the DC Bus 38a to supply the load 50 (e.g., 50a). This connection and the connections 102 and 122 on the fourth positive rail plate as well as the sixth bus rail plate 120f facilitates the series connection of every two capacitors, and there parallel combination of four sets of two series capacitors.

In this manner, the schematic of FIG. 2C is implemented to provide for two parallel connected drives 20a and 20b with respective rectifier/converters 30a and 30b and filters 40a and 40b. Drive 20a is configured with three phase AC power signal inputs 13a, 13b, and 13c on connections 14a, 14b, and 14c respectively and DC output on terminal 16a-c relative to negative connection 16f-h. Similarly, drive 20b is configured with three phase AC power signal inputs 13d, 13e, and 13f on connections 14d, 14e, and 14f respectively, as well as DC output on terminal 16a-c relative to negative connection 16f-h. The common point of the capacitor is also carried out to connector 16d.

Embodiments include the use of paralleled drives in order to meet high load demands without the need to design or source a single, high power drive. Using parallel drives with passive rectifiers and the control methodologies described herein, allows the drive system to meet load demands through multiple, lower power drives. This eliminates the cost and/or development time associated with a single, higher power drive. Likewise, series multilevel drives facilitate achieving higher bus voltages and thereby higher load voltages when needed without needing to use higher voltage components. Such configurations improve overall reliability and cost compared to a single rectifier/converter with higher voltage rating components.

It should be appreciated that in the described embodiments, while specific configurations of the adapter plates 100, 110, and 120 are described to implement a particular configuration of the circuits of FIGS. 2A-2C, other configurations are possible. For example, the arrangements and physical layout of the components could be modified without departing from the scope of the claims. Furthermore, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A reconfigurable three-phase rectifier/converter drive, the drive comprising:
    a first three phase input connection and a second three phase input connection, the first three phase input connection and the second three phase input connection configured for connection to a three phase alternating current power source;
    a first three-phase rectifier bridge having three phase legs, each phase leg having a positive connection, a negative connection and an input connection operably connected to the first three phase input connection;
    a second three-phase rectifier bridge having three phase legs, each phase leg having a positive connection, a negative connection and an input connection operably connected to the second three phase input connection;
    a plurality of a capacitors, each capacitor having a positive and a negative connection, the plurality of capacitors configurable as a first filter and a second filter;
    a positive output terminal; a negative output terminal, and a third output terminal wherein at least the positive output terminal and negative output terminal are connected to and configured to supply a load;
    at least one positive rail adaptor plate configured to selectively connect at least one of the positive connections for the first three-phase rectifier bridge and the positive connection of second three-phase rectifier bridge, selected positive connections of the plurality of capacitors, and the positive output terminal;
    at least one negative rail adaptor plate configured to selectively connect at least one of the negative connections for the first three-phase rectifier bridge and the negative connections of second three-phase rectifier bridge, selected negative connections of the plurality of capacitors, and the negative output terminal;
    at least one of filter bus adapter plate configured to selectively connect at least one selected positive and negative connections of the plurality of capacitors, and the negative connections for the first three-phase rectifier bridge and the positive connections of second three-phase rectifier bridge;
    wherein the three-phase rectifier/converter drive is configurable by selected connections with the at least one positive rail adaptor plate, the at least one negative rail adaptor plate, and at least one of filter bus adapter plate as at least one of two independent drives supplying independent loads, two drives in series supplying a common load, and two drives in parallel supplying a common load.

2. The reconfigurable three-phase rectifier/converter drive of claim 1, wherein the at least one positive rail adaptor plate, at least one negative rail adaptor plate, and at least one of filter bus adapter plate are stacked over one another.

3. The reconfigurable three-phase rectifier/converter drive of claim 1, wherein the at least one positive rail adaptor plate, the at least one negative rail adaptor plate, and the at least one of filter bus adapter plate each include at least one of a plurality of connection points and a plurality of cutouts.

4. The reconfigurable three-phase rectifier/converter drive of claim 3, wherein the plurality of connection points facilitate selected connections to selected components of the drive, while the plurality of cutouts ensure noncontact to other selected components of the drive.

5. The reconfigurable three-phase rectifier/converter drive of claim 1, further including a second positive rail adaptor plate configured and connected substantially as a mirror image of the first positive rail adaptor plate, the second positive rail adaptor plate having a second positive output connection connected to a second positive output terminal.

6. The reconfigurable three-phase rectifier/converter drive of claim 5, wherein the second positive rail adaptor plate is configured and connected substantially as a mirror image of the first positive rail adaptor plate.

7. The reconfigurable three-phase rectifier/converter drive of claim 1, further including a second negative rail adaptor plate configured and connected substantially as a mirror image for the first negative rail adaptor plate, the second negative rail adaptor plate having a second negative output connection connected to a second negative output terminal.

8. The reconfigurable three-phase rectifier/converter drive of claim 7, wherein the second negative rail adaptor plate is configured and connected substantially as a mirror image of the first negative rail adaptor plate.

9. The reconfigurable three-phase rectifier/converter drive of claim 1, wherein the at least one filter bus adaptor plate includes at least one output connection under selected conditions.

10. The reconfigurable three-phase rectifier/converter drive of claim 1, further including a common point connector and the at least one of filter bus adapter plate connected to the common point connector.

11. The reconfigurable three-phase rectifier/converter drive of claim 1, wherein selected connections of the positive rail adapter plate, negative rail adapter plate and filter bus adapter plate configure the plurality of capacitors in selected series and parallel arrangements for each of the at least one of two independent drives supplying independent loads, two drives in series supplying a common load, and two drives in parallel supplying a common load.

12. A method of configuring a three-phase rectifier/converter drive, the method comprising:
- operably connecting a first three phase input connection and a second three phase input connection to a three phase alternating current power source;
- operably connecting a first three phase rectifier bridge having three phase legs, each phase leg having a positive connection, a negative connection and an input connection operably connected to the first three phase input connection;
- operably connecting a second three phase rectifier bridge having three phase legs, each phase leg having a positive connection, a negative connection and an input connection operably connected to the second three phase input connection;
- configuring a plurality of a capacitors as a first filter and a second filter, each capacitor having a positive and a negative connection;
- operably connecting a positive output connection and a negative output connection, wherein at least the positive output connection and negative output connection are connected to and configured to supply a load;
- selectively connecting at least one of the positive connections for the first three-phase rectifier bridge and the positive connection of second three-phase rectifier bridge, selected positive connections of the plurality of capacitors, and the positive output terminal with at least one positive rail adaptor plate;
- selectively connecting at least one of the negative connections for the first three-phase rectifier bridge and the negative connections of second three-phase rectifier bridge, selected negative connections of the plurality of capacitors, and the negative output terminal with at least one negative rail adaptor plate;
- selectively connecting at least one selected positive and negative connections of the plurality of capacitors, and the negative connections for the first three-phase rectifier bridge and the positive connections of second three-phase rectifier bridge with at least one filter bus adapter plate;
- configuring the three-phase rectifier/converter drive as at least one of two independent drives supplying independent loads, two drives in series supplying a common load, and two drives in parallel supplying a common load, by selecting connections with at the least one positive rail adaptor plate, the at least one negative rail adaptor plate, and the at least one of filter bus adapter plate.

13. The method of configuring a reconfigurable three-phase rectifier/converter of claim 12, further including stacking the at least one positive rail adaptor plate, at least one negative rail adaptor plate, and at least one of filter bus adapter plate over one another.

14. The method of configuring a reconfigurable three-phase rectifier/converter drive of claim 12, wherein the at least one positive rail adaptor plate, the at least one negative rail adaptor plate, and the at least one of filter bus adapter plate each include at least one of a plurality of connection points and a plurality of cutouts.

15. The method of configuring a reconfigurable three-phase rectifier/converter drive of claim 14, wherein the plurality of connection points facilitate selected connections to selected components of the drive, while the plurality of cutouts ensure noncontact to other selected components of the drive.

16. The method of configuring a reconfigurable three-phase rectifier/converter drive of claim 12, further including connecting a second positive rail adaptor plate, the second positive rail adaptor plate having a second positive output connection connected to a second positive output terminal.

17. The method of configuring a reconfigurable three-phase rectifier/converter drive of claim 12, further including connecting a second negative rail adaptor plate, the second negative rail adaptor plate having a second negative output connection connected to a second negative output terminal.

18. The method of configuring a reconfigurable three-phase rectifier/converter drive of claim 12, further including connecting at least one output connection to the at least one filter bus adaptor plate under selected conditions.

19. The method of configuring a reconfigurable three-phase rectifier/converter drive of claim 12, further including a common point connector and the at least one of filter bus adapter plate connected to the common point connector.

20. The method of configuring a reconfigurable three-phase rectifier/converter drive of claim 12, wherein selected connections of the positive rail adapter plate, negative rail adapter plate and filter bus adapter plate configure the plurality of capacitors in selected series and parallel arrangements for each of the at least one of two independent drives supplying independent loads, two drives in series supplying a common load, and two drives in parallel supplying a common load.

* * * * *